United States Patent [19]

Stevenson et al.

[11] 4,368,705
[45] Jan. 18, 1983

[54] ENGINE CONTROL SYSTEM

[75] Inventors: Thomas T. Stevenson; John F. Szentes; Marios C. Zenios, all of Peoria, Ill.

[73] Assignee: Caterpillar Tractor Co., Peoria, Ill.

[21] Appl. No.: 277,745

[22] PCT Filed: Mar. 3, 1981

[86] PCT No.: PCT/US81/00269
§ 371 Date: Mar. 3, 1981
§ 102(e) Date: Mar. 3, 1981

[87] PCT Pub. No.: WO82/03107
PCT Pub. Date: Sep. 16, 1982

[51] Int. Cl.³ .......................... F02D 1/04; F02D 1/06
[52] U.S. Cl. .................................. 123/357; 123/486; 123/416; 123/358; 123/501
[58] Field of Search ............... 123/357, 358, 480, 486, 123/501, 502

[56] References Cited

U.S. PATENT DOCUMENTS

| | | | |
|---|---|---|---|
| 3,699,935 | 10/1972 | Adler et al. | 123/357 |
| 3,796,192 | 3/1974 | Locher et al. | 123/357 |
| 3,815,564 | 6/1974 | Suoa et al. | 123/357 |
| 3,960,120 | 6/1976 | Aono et al. | 123/32 |
| 3,964,443 | 6/1976 | Hartford | 123/486 |
| 4,019,478 | 4/1977 | Aono et al. | 123/357 |
| 4,048,965 | 9/1977 | Bianchi | 123/486 |
| 4,084,240 | 4/1978 | Lappington | 364/425 |
| 4,128,900 | 12/1978 | Lappington | 365/94 |
| 4,191,137 | 3/1980 | Williams et al. | 123/32 |
| 4,205,377 | 5/1980 | Oyama et al. | 364/431 |
| 4,212,065 | 7/1980 | Marchak et al. | 364/431 |
| 4,217,862 | 8/1980 | Fort et al. | 123/357 |
| 4,223,654 | 9/1980 | Wessel et al. | 123/358 |
| 4,265,200 | 5/1981 | Wessel et al. | 123/357 |

OTHER PUBLICATIONS

Research Disclosure Dated Nov. 1978.

Primary Examiner—Ronald B. Cox
Attorney, Agent, or Firm—Stephen L. Noe

[57] ABSTRACT

An electronic engine control system (10) utilizing a digital microprocessor (30) for controlling the timing mechanism (13) and fuel pump rack limit (23) to set the engine timing of, and maximum allowable rate of fuel delivery to, an interval combustion engine (11) so that maximum engine performance is obtained with smoke and emissions limited to required EPA levels. A plurality of timing maps (61-64) are provided, for different modes of engine operation, each map having predetermined value timing control signals programmed therein corresponding to the optimal timing advance of a particular engine speed, or particulaoptimoptimal timing advance of a particular engine speed, or particular combination of engine speed and position of the fuel rack (21). A timing map selector (65) identifies the mode of engine operation and selects the appropriate timing map (61-64) to control the timing mechanism (13) by the particular programmed signal for the existing engine speed and fuel rack position. A similar map (71) will output a particular programmed fuel/air signal in accordance with the existing engine speed and timing, the fuel/air signal having been predetermined to correspond to the maximum fuel/air ratio for fuel combustion to meet EPA limits for that engine speed and timing. The fuel/air signal is multiplied (76) in accordance with existing manifold pressure and the resultant fuel delivery signal is used to set the rack limit (23) for maximum allowable fuel delivery to the engine (11).

26 Claims, 17 Drawing Figures

FUEL/AIR LIMIT
MAP 71

RACK LIMIT POSITION
MAP 72

ALTITUDE DERATING MAP 74

TORQUE RISE LIMIT MAP 73

TIMING ADV. ANGLE CONTROL SIGNAL

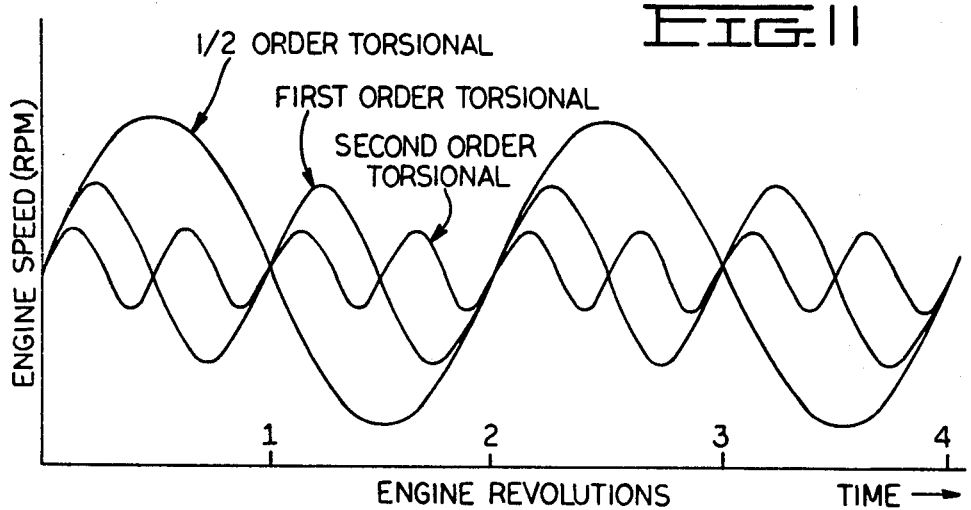
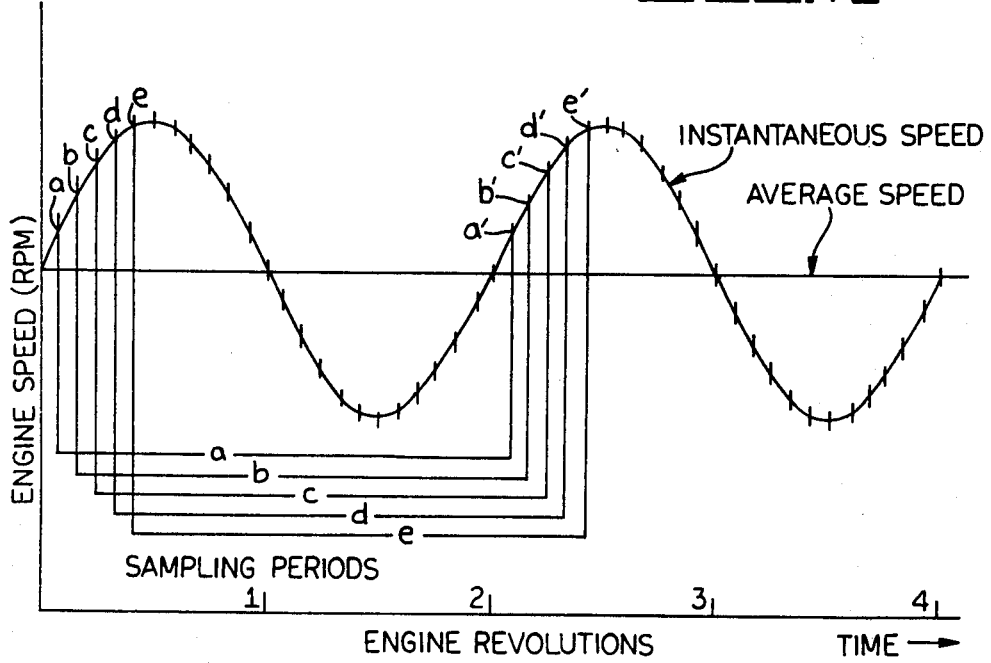

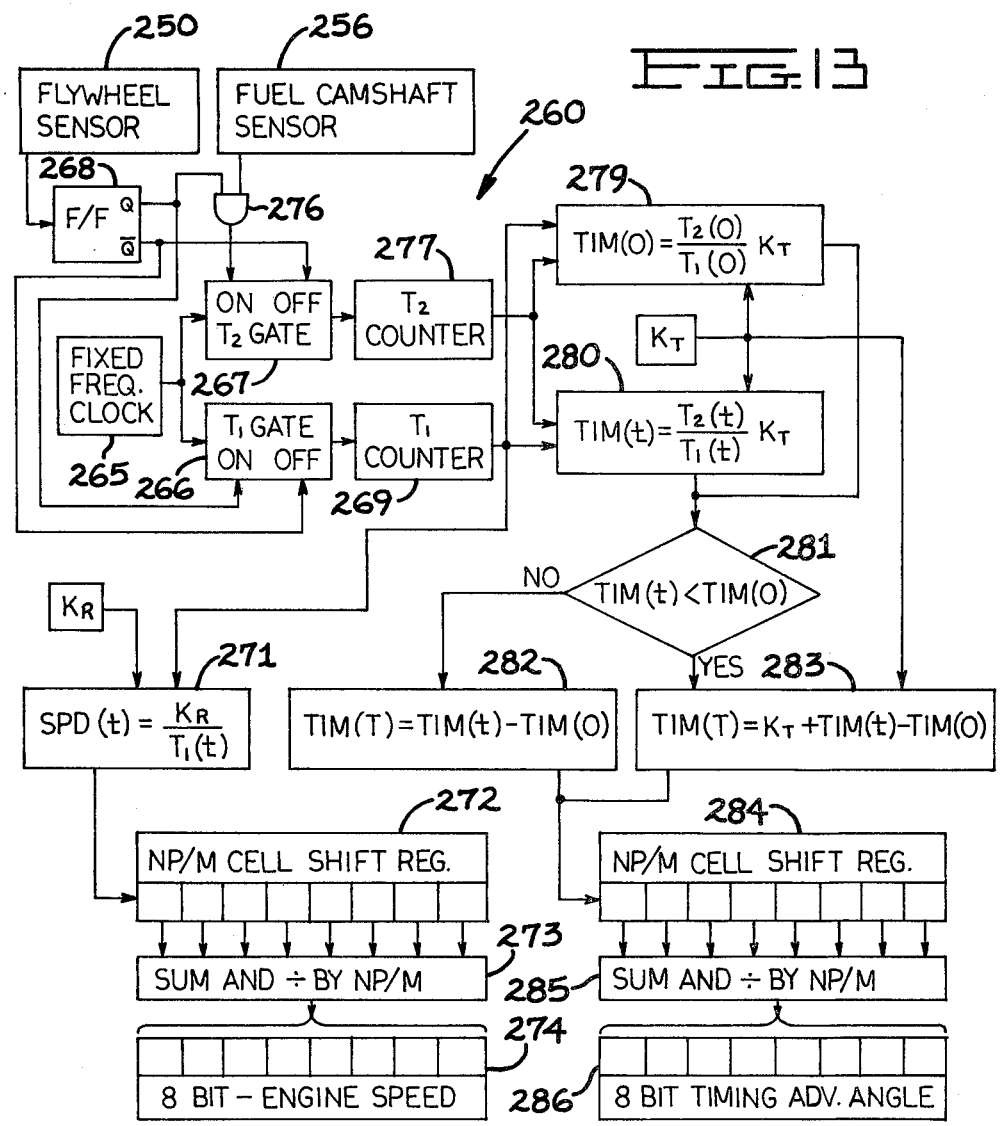

ENGINE CONTROL SYSTEM

DESCRIPTION

1. Technical Field

This invention relates generally to diesel engines and more particularly to a control system for regulating the engine timing advance and the rack limit position of the fuel pump associated with the engine.

2. Background Art

The operation of a diesel engine is controlled basically by varying the amount of fuel delivered to the engine cylinders and by setting the time of fuel injection into the cylinders relative to the time that the pistons reach top dead center on their compression strokes. In general, the amount of fuel delivered to the engine will control the speed of the engine and the timing of fuel injection will affect the efficiency of fuel combustion and engine operation. For example, if the engine speed increases, the timing advance angle of fuel injection must be increased to provide more time in a cycle of operation for compression, ignition and combustion of the injected fuel. If the timing advance is too great, however, ignition and combustion will occur too early in the cycle and the efficiency of operation will be adversely affected.

A typical four-stroke-cycle diesel engine includes a timing shaft which is gear driven by the engine crank shaft at half engine speed, the timing shaft being coupled to the fuel camshaft of a fuel pump by a timing mechanism so that the fuel pump is engine driven and will deliver fuel to half of the engine cylinders during one engine revolution and to the other half of the cylinders during the next revolution. The fuel pump includes a movable, throttle-actuated fuel rack, under the control of the engine operation, to vary the amount of fuel delivered by the pump to the engine, up to the maximum amount permitted by the governor, or rack limit. The timing mechanism will vary the angular relationship between the rotating timing shaft and fuel camshaft to control the time of fuel injection into the cylinders.

The Environmental Protection Agency (EPA) has set Federal emission standards regulating the amount of smoke and gaseous emission which may be exhausted from an engine. Catalytic converters and exhaust gas recirculation have been used to reduce emission to acceptable levels, but at a significant reduction in fuel economy. It is preferable, as in the present invention, to control engine operation so that the fuel in the engine cylinders sufficiently burns and the exhaust components are within the required levels. To achieve the desired degree of combustion of the fuel-air mixture in the cylinders, a sufficient amount of air, relative to the amount of fuel in the mixture must be present for combustion and sufficient time must be allowed for the fuel to burn.

In order to accomplish this, it is necessary to regulate the operation of the fuel pump so that the amount of fuel which the operator can demand, by throttle operation, to be delivered to the cylinders, be limited to that which can be burned with the necessary degree of combustion in the available air in the fuel-air mixture.

At the same time, and in order to provide for maximum allowable engine performance and fuel economy, it may be desired that the engine timing advance not be greater, nor the fuel rack limit be less, than that required to meet the emission standards.

As a consequence, there is a need for an automatic engine control which will precisely regulate engine timing and rack limit so that emission standards are met with the least possible loss of overall engine efficiency.

There are considerable problems involved in providing such an engine control.

If an engine were to be operated at a constant speed and constant load, it would be a relatively simple matter to set the timing and fuel rack for optimal performance. However, that is not the case where vehicle engines are concerned, since many different modes of engine operation are necessary. Operation of the engine while cold will require settings of optimal timing advance for the many various combinations of engine speed and fuel rate which are different from the optimal timing advance for engine operation at normal running temperatures. Optimal timing advance for steady state running will differ between highway and urban operation. They will likewise differ when the engine is accelerating or decelerating. The optimal position of the rack limit for a given engine speed and timing will depend upon whether the engine is in a normal running or lugging mode and also upon the altitude at which the engine is operating.

The various different modes of engine operation, each requiring different settings of engine timing and/or rack limit position, make it necessary that the engine control be able to identify the particular mode in which the engine is operating and to set the timing advance and/or rack limit for optimal performance at the various combinations of engine speed and fuel delivery that are encountered in such mode.

An engine control system must continuously monitor the actual speed of the engine and the actual timing advance to which the timing mechanism has set the fuel pump. In order to provide precise control over operation, the achieved speed and timing advance must be measured with precision and any changes in speed or timing angle must be noted with as small a lag time as possible. It is desirable to update the status of these monitored conditions many times during a single engine revolution, which introduces another problem in that inherent engine torsionals will cause the instantaneous engine speed to vary somewhat sinusoidally over two full revolutions of the engine. As a consequence it is necessary that the torsional variations in speed be cancelled to provide engine speed indications many times during an engine revolution, with each speed indication being that of the average speed of the engine.

In order to set the rack limit to control the maximum allowable amount of fuel which the operator can cause to be injected at any time into the engine, it is first necessary to determine the optimal amount of fuel which can be burned with the desired efficiency in an engine cylinder. There has been a problem in determining this amount since this rate of fuel delivery is an interdependent function of engine timing advance, engine speed and amount of air introduced into the cylinders along with the fuel.

Microprocessors have come into use in various control system to store programmed information and to process such information quickly and reliably in response to sensed conditions so that control functions may be carried out. In general, the level of sophistication of operation of such systems seems limited only by the amount of money one is willing to spend on the system and, of course, by the inventiveness of the system designers. However, there is still a problem in designing such systems to achieve particular desired results with a sufficient level of accuracy and response time and at the least expense.

The present invention is directed to overcoming one or more of the problems set forth above.

DISCLOSURE OF THE INVENTION

In one aspect of the invention, an engine-fuel supply system has an internal combustion engine and a fuel pump driven by the engine. The fuel pump has a movable fuel rack for controlling the amount of fuel delivered to the engine. A first settable engine control means has a timing means for driving the fuel pump at a desired timing advance angle relative to engine rotation, and a second settable engine control means has a rack limit means for limiting movement of the fuel rack in its fuel-increasing direction. A control system is provided having first and second condition signal means for monitoring first and second conditions of engine operation and a control signal means for storing a plurality of engine control signals. Each engine control signal has a predetermined value corresponding to a desired setting of one of the settable engine control means for desired operation at a particular combination of first and second engine conditions and for generating an engine control signal having the predetermined value for the monitored engine conditions. Means is provided for receiving the generated engine control signal and setting the one settable engine control means in response to said received signal.

A further aspect of the invention is that separate control signal means as described above are used to control the engine timing means and the rack limit means.

Another aspect of the invention is that a plurality of separate control signal means, as described above, are programmed for desired timing angle advance relative to different combinations of actual engine speed and fuel rack positions for a particular mode of engine operation. Selector means select the proper control signal means in accordance with the particular mode in which the engine is operating, deliver the selected control signal to actuate the timing means, and set the engine timing to the desired value for the existing actual speed and fuel rack position.

In still another aspect of the invention, the fuel delivery rate, used to set the rack limit, is determined by obtaining the optimal fuel/air ratio for the particular speed and timing advance angle of the engine and by multiplying such fuel/air ratio by the manifold pressure to obtain a value proportional to the maximum amount of fuel to be injected into an engine cylinder.

Another aspect of the invention is that in the control system, instantaneous engine speed signals are measured a plurality of times for each revolution of the engine, and each time an instantaneous speed signal is obtained, the instantaneous speed signals obtained during the past two engine revolutions are averaged to cancel out the effect of engine torsionals so that an average speed signal is obtained a plurality of times for each revolution of the engine.

Yet another aspect of the invention is that digital condition and control signals in binary form are used in the control system and that an interpolation method is used in the control signal means to obtain the predetermined control signals by reading a programmed memory in accordance with the most significant bits of the control signal, and by interpolating between adjacent programmed signals in accordance with the least significant bits of the control signals.

The foregoing and other aspects will become apparent from the following detailed description of the invention when considered in conjunction with the accompanying drawings.

BRIEF DESCRIPTION OF THE DRAWINGS

FIG. 11 is a graph illustrating the effect of engine torsionals;

FIG. 12 is a graph illustrating the torsional cancellation technique by which average engine speed signals are obtained for use in the present invention;

FIG. 13 is a block diagram of one form of the data processors of FIG. 10;

BEST MODE FOR CARRYING OUT THE INVENTION

Figure 1:
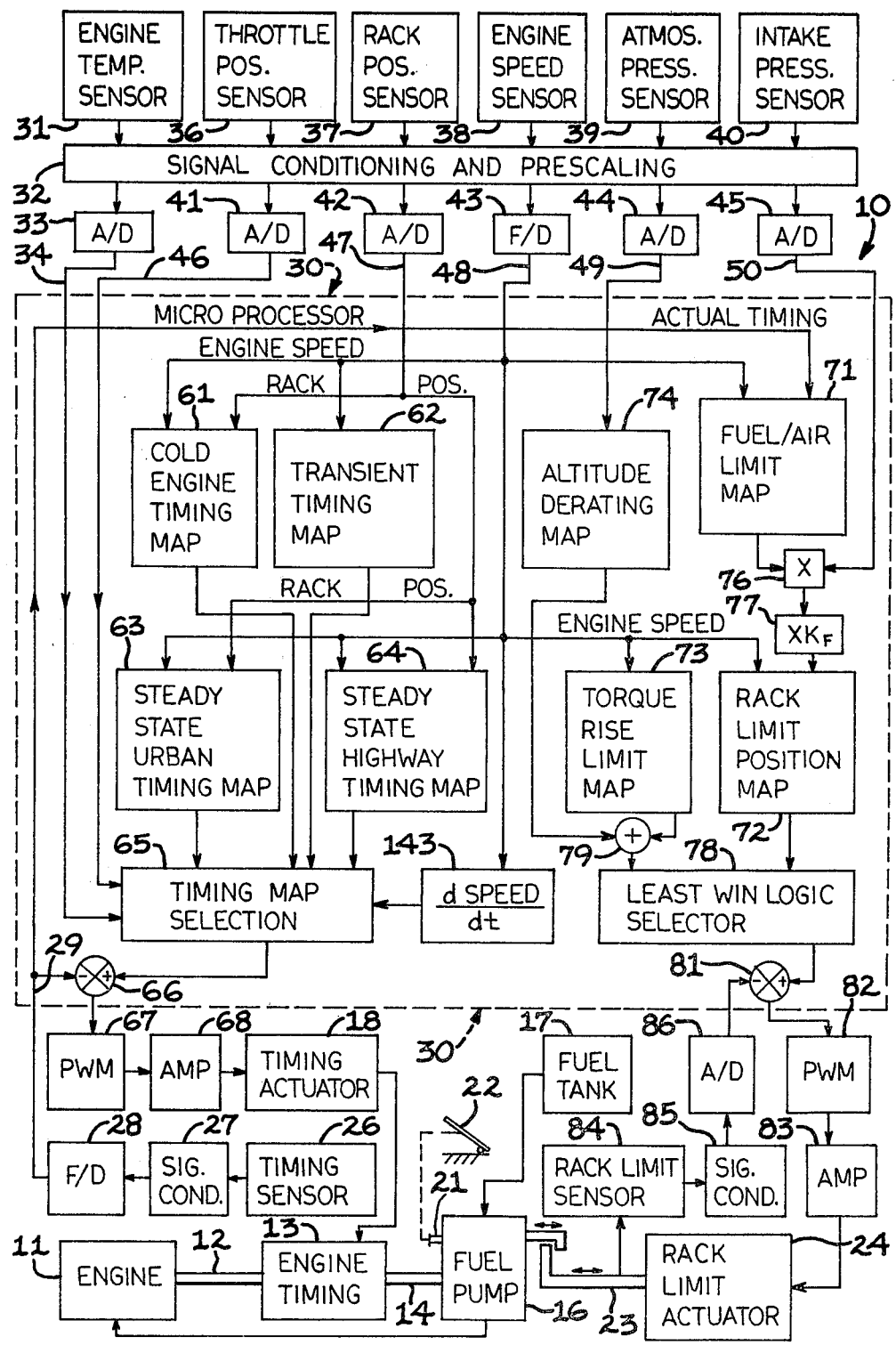
FIG. 1 is a block diagram of an engine-fuel pump system and a control system therefor utilizing the present invention.

Referring now to the drawings, wherein a preferred embodiment of the invention is illustrated, FIG. 1 shows in block diagram form a control system 10 for use with internal combustion engine 11. The engine 11, which may be a four-stroke-cycle diesel engine, drives a timing shaft 12 which is coupled, by engine timing means 13, to the fuel camshaft 14 of fuel pump 16. As is conventional, timing means 13 will set a minimum phase shift between the timing shaft 12 and fuel camshaft 14 so that fuel pump 16 will deliver fuel from fuel tank 17 to the cylinders of engine 11 at a minimum advance angle, typically 14° BTDC, on the compression stroke of the engine pistons. Actuation of the timing means 13 by a timing actuator 18 will vary the timing of fuel delivery between minimum and maximum advance angles.

The fuel pump 16 has a movable fuel rack 21, actuated by an operator-controllable throttle, such as foot pedal 22, to control the amount of fuel delivered by fuel pump 16 to the engine 11. As best shown in FIG. 1, depression of the foot pedal 22 will move the fuel rack 21 to the left to increase fuel delivery. Release of the foot pedal will move fuel rack 21 to the right, decreasing fuel delivery. A reciprocatable rack limit 23, functioning as a governor, will prevent leftward (fuel increasing) movement of fuel rack 21 beyond the limit set by rack limit actuator 24, even though the operator may be then demanding a greater fuel flow by depression of foot pedal 22. Rack limit 23 allows rightward movement of fuel rack 21 from the limit position so that the operator may control fuel delivery by foot pedal 22 between minimum fuel delivery and the maximum set by rack limit 23.

The timing means 13 and fuel rack limit 23 constitute first and second settable engine control means which are themselves controlled by the control system 10 of the present invention. This control system 10 has two primary functions. First, the control system 10 functions to cause timing actuator 18 to adjust the engine timing means 13 and thereby set the proper engine timing advance angle for efficient combustion. Second, it functions to cause rack limit actuator 24 to move rack limit 23 and set it to limit the maximum amount of fuel which the fuel pump can deliver to the engine cylinders.

Preferably, the following conditions of engine operation are continuously monitored and used in the control system 10 to set the engine timing and rack limit position: actual engine timing, engine temperature, throttle position, fuel rack position, actual engine speed, atmospheric pressure and intake manifold pressure.

A timing sensor 26 continuously monitors the magnitude of the actual timing advance angle set by engine timing means 13 and generates a condition signal having a value dependent upon the magnitude of the timing advance. This condition signal is shaped and prescaled by signal conditioner 27, converted from a frequency signal to a digital signal by frequency/digital converter 28 and applied to input line 29 of microprocessor 30. As will be described hereinafter, the actual timing information is updated every 30° or 60° of engine rotation, depending upon the particular embodiment of the sensor system used. This will be described subsequently in connection with FIGS. 10-17.

The engine temperature is monitored, as for example by a conventional analog sensor 31 which senses the temperature of the engine coolant, to determine whether the engine is cold, as on start-up, or whether it has reached normal running condition. The condition signal from the engine temperature sensor 31 is shaped and prescaled by conditioner 32, converted from analog to digital form by converter 33, and applied to microprocessor input line 34.

Throttle position is monitored by sensor 36, which may include a potentiometer linked to foot pedal 22, to determine whether the operator has called for acceleration by a depression of the pedal or deceleration by a release of the pedal. The actual position of fuel rack 21 is sensed by rack position sensor 37, which may include a potentiometer linked to the fuel rack 21, to provide information as to the amount of fuel being delivered by fuel pump 16 to engine 11.

Actual engine speed is continuously monitored by the engine speed sensor 38. As will be described hereinafter, new actual engine speed signals are generated every 30° or 60° of engine rotation, depending upon the particular sensor system used, so that the engine control system 10 will respond very quickly to changes in the engine speed.

Atmospheric pressure and intake manifold pressure are monitored by conventional pressure transducers 39 and 40, respectively.

The operating condition signals from sensors 36-40 are likewise shaped and prescaled by signal conditioners 32, converted to digital form by converters 41-45, analog-digital or frequency-digital, depending upon the nature of the condition signals, and applied to input lines 46-50 of the microprocessor 30.

In general, the microprocessor 30 will respond to the condition signals of the aforementioned sensors 31,36,37,38,39,40 and will output engine control signals to set the engine timing and rack limit to desired and predetermined positions.

In the preferred embodiment, the microprocessor 30 includes a plurality of "maps" for controlling engine timing and rack position. The various maps described below each constitute a control signal means for storing a plurality of engine control signals, with each stored control signal having a predetermined value corresponding to a desired setting of one of the settable engine control means 13 or 23 for desired operation at a particular combination of engine operating conditions, and for generating an engine control signal having the predetermined value corresponding to the particular value of the engine operating conditions as indicated by the engine condition signals.

Figure 2:
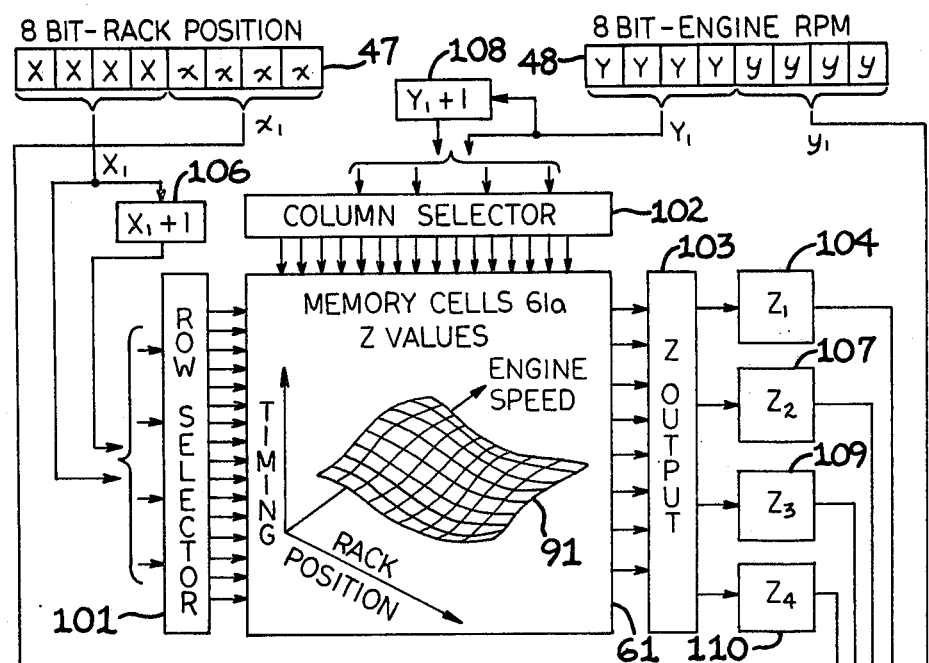
FIG. 2 is a block diagram of one of the control signal means of FIG. 1, and in particular, the cold engine timing map.

More particularly, microprocessor 30 includes four maps, 61,62,63 and 64 which are used to control the engine timing. As indicated in FIG. 2 the "cold engine map" 61 will have stored within its read-only memory 61a (FIG. 2) a plurality of predetermined engine timing control signals for various combinations of actual engine speed and rack position. The values of the timing control signals are determined empirically for an engine family by carrying out tests on a cold engine (of that family) and compiling a schedule of the optimum values of engine timing for various combinations of engine speed and rack position which will enable the engine to operate with its exhaust to meet the EPA emission standards. After this engine timing schedule has been completed, the values are programmed into the various cells of read-only memory 61a. The actual speed and rack position condition signals are applied to map 61 during operation of the vehicle, and the map will output, to timing map selector 65 an engine control signal having the desired value, for the existing speed and fuel rack positions which will set the timing means 13 for engine operation meeting the EPA emission standards.

The "transient timing map" 62 will have stored therewithin the proper timing angle values for different engine speeds, such values again having been determined by testing for efficient engine operation when the engine is accelerating or decelerating. The actual engine speed signals are applied to the map with corresponding engine timing angle signals being output to selector 65.

The "steady state urban timing map" 63 and "steady state highway timing map" 64 are similar to the cold engine timing map 61 in that maps 63 and 64 have stored therewithin the proper engine timing value for each combination of engine speed and rack position, such values again being predetermined to meet EPA standards for urban and highway driving, respectively. Also, as before, the particular timing angle values for the existing engine speed and rack position are output to map selector 65.

Map selector 65 functions to determine which of the following modes what of engine operation exists: cold, transient, steady state urban or steady state highway; and to allow the timing angle control signals at the output of the correct one of the maps 61-64 to pass to summing junction 66. If the timing angle control signals indicate that the engine timing should be changed, summing junction 66 will output a signal to a pulse width modulator 67 and a power amplifier 68 will then drive the timing actuator 18 so that the engine timing means 13 will change the engine timing to the desired timing advance angle between timing shaft 12 and fuel camshaft 14. The timing sensor 26 senses the engine timing an provides a signal which, after processing by the signal conditioner 27 and frequency to digital converter 28, is output to the microprocessor input line 29. The signal is then fed to summing junction 66 so that the output of the summing junction 66 will cease when the actual engine timing equals the desired engine timing.

Because of the smoke and emission requirements, fuel flow must be related to air flow through the engine so that sufficient air is provided for substantially complete fuel combustion. The fuel/air ratio for a given smoke level will vary with engine speed. To prevent engine lugging, more fuel must be injected, but with the fuel/air ratio being controlled to maintain efficient fuel combustion. During acceleration or deceleration it is desired for the engine 11 to produce maximum power within acceptable smoke limits. Operation at high altitudes requires a decrease in fuel delivery to maintain the proper fuel/air ratio for proper combustion.

The rate of air flow through the engine will vary with the manifold pressure and the rate of fuel flow will vary with the position of fuel rack 21. The maps 71,72,73 and 74 of microprocessor 30 are used in the present system to set the position of rack limit 23 and thereby limit the amount of movement of fuel rack 21 in its fuel-increasing direction so that the engine operator cannot cause the fuel injection rate and consequently the fuel/air ratio to increase beyond that which will produce an acceptable amount of smoke in the engine exhaust.

The "fuel/air limit map" 71 has programmed therein predetermined values, established by empirical testing, corresponding to the maximum fuel/air ratio for sufficient combustion to meet EPA standards for various different combinations of engine speed and timing within the operating ranges of those conditions.

In operation, map 71 will output a fuel/air signal proportional to the maximum amount of fuel to amount of air of the mixture to be injected into the engine during a stroke thereof for the then existing timing angle and engine speed. The fuel/air output signal of map 71 is applied to multiplier 76, along with the condition signal from the intake manifold pressure sensor 40, the latter signal being proportional to the intake pressure, for example, in pounds per square inch gauge. Since the weight of air injected into the engine cylinders with the fuel is proportional to the manifold pressure, multiplier 76 will output a signal proportional to the maximum weight of fuel to be injected during a stroke thereof. The output of multiplier 76 is then multiplied in multiplier 77 by $K_F$, a dimensional constant dependent upon the cylinder size and fuel pump size of the particular engine 11 and fuel pump 16, to give a fuel-delivery signal proportional to the maximum weight of fuel to be delivered to the engine 11 during a piston stroke thereof.

The fuel-delivery signal from multiplier 77 is input into "rack limit position map" 72, which has stored therewithin rack limit position values, predetermined in accordance with the physical characteristics of the fuel pump 16. These correspond to the positions at which the rack limit 23 is to be set to give the desired rate of fuel delivery at the existing engine (and hence fuel pump) speed. The rack limit position control signals from map 72 are output to map selector 78.

When, in operation, the engine speed decreases due to a loading, the fuel rack 21 must be allowed to move and provide more fuel to the engine. The "torque rise limit map" 73 is provided to increase the rack limit position and thereby allow the fuel rack 21 to move in a fuel-increasing direction in such mode of operation and thereby prevent engine lugging. The torque rise limit map 73 has stored therein rack limit position control signal values, predetermined to allow more fuel to be injected at lower speeds without causing emissions exceeding the EPA standards. The rack limit position control signals generated by map 73 in response to application of engine speed signals thereto are applied through summing junction 79 to selector 78.

The "altitude derating map" 74 has stored therewithin rack limit position control signal values, predetermined to meet EPA standards, for different values of ambient air pressure. The output of map 74 is applied to summing junction 79 which functions to decrease the value of the rack limit position control signal and thus cut back the fuel rack 21 at higher altitudes to maintain an optimal fuel/air ratio.

Map selector 78 functions as a "least win logic" so that the lowest value of the rack limit position control signals from map 72 and the signal from summing junction 79 is output to summing junction 81. If such control signal indicates that the position of rack limit 23 is to be changed, summing junction 81 will output a signal to pulse width modulator 82 and power amplifier 83 will then drive the rack limit actuator 24 to cause the desired movement of rack limit 23. The position of rack limit 23 is sensed by rack limit sensor 84, which may include a potentiometer coupled to the rack limit 23, and the signal therefrom is conditioned and prescaled by signal conditioner 85, converted to digital form by converter 86 and fed back to the summing junction 81 so that the rack limit actuator 24 will cease to be driven when the actual rack limit position is the same as the desired rack limit position.

Figure 3:
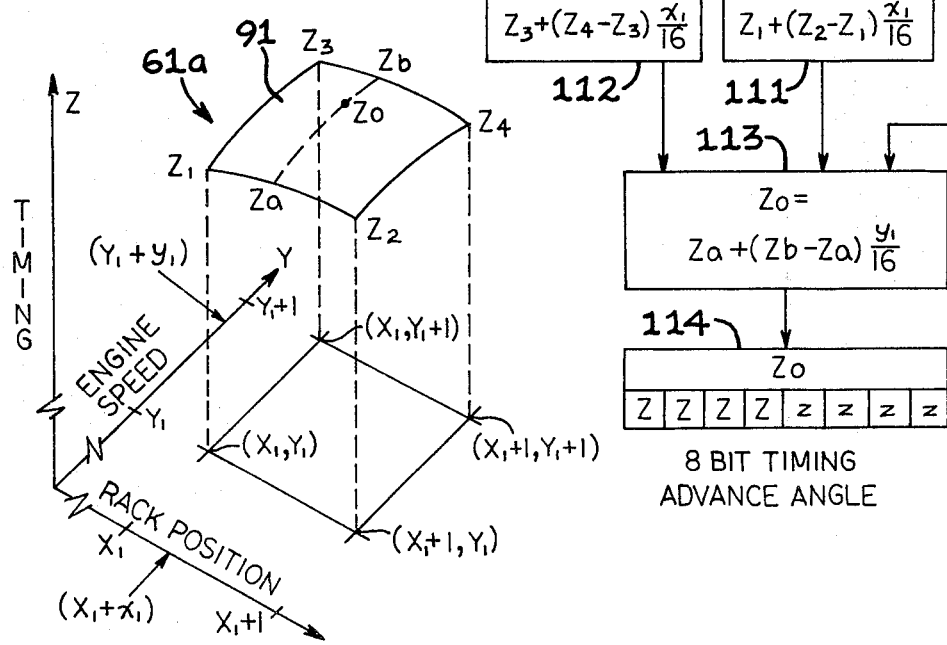
FIG. 3 is a three dimensional graph illustrating the memory portion of the map of FIG. 2.

FIGS. 2 and 3 illustrate the manner in which an engine timing control signal from the cold engine timing map 61 is obtained for a particular combination of actual engine speed and rack position. As used herein, the term "map" includes a read-only memory and the input and output circuitry of the memory.

The input line 47 into microprocessor 30 has an eight-bit binary signal, or byte, thereon from rack position sensor 37 representing the actual position of fuel rack 21. The signal will have been prescaled to the range of rack movement so that the 256 possible combinations of the byte represent the corresponding number of incremental positions of the rack between its minimum and maximum position. Likewise, input line 48 will have a byte thereon, the particular binary value of which will represent a particular engine speed within the range of minimum and maximum operating speeds.

As shown in FIG. 2, the cold engine timing map 61 includes a read-only memory 61a having a three-dimensional schedule with 16 rows and 16 columns, and with a Z-value byte stored within the memory for each combination of a row and column. The 256 bytes stored in the memory are determined, for the family of engine with which the control system is to be used, through testing to represent the correct timing angle advance for the various possible combinations of rack position and engine speed which will meet EPA standards. If the byte values for the timing angle signal were plotted graphically, the scheduled byte values would lie on a three-dimensional surface 91, at the intersection of the 16 rows thereon corresponding to different values of rack position and the 16 columns corresponding to the different values of actual engine speed.

In the particular form of the present invention described herein, the rack position signal on line 47 and the actual engine speed signal on line 48 will be updated at most each time the engine 11 rotates through 30°, and the binary values of these signals will remain constant between updates.

In operation, the four most significant bits ($X_1$) of the rack position signal on input line 47 will be applied to row selector 101, and the four most significant bits ($Y_1$) of the engine speed signal on input line 48 will be applied to column selector 102 to select the particular row ($X_1$) and column ($Y_1$) of memory 61a. The $Z_1$ byte (FIG. 4) corresponding to the $X_1$ row and $Y_1$ column is outputted from memory 61a and Z output selector 103 to the $Z_1$ memory 104.

The $X_1$ bits are also applied to stepper 106 which adds a binary 1 to the $X_1$ value and the stepped ($X_1+1$) bits are then applied to row selector 101, while the $Y_1$ bits are applied to column selector 102, to select the ($X_1+1$) row and $Y_1$ column. The $Z_2$ byte for the ($X_1+1$) row and $Y_1$ column is then stored into the $Z_2$ memory 107.

Similarly, the ($Y_1+1$) value from stepper 108 and the $X_1$ value are applied to the map and the corresponding $Z_3$ byte is stored in the $Z_3$ memory 109. Subsequently, the ($X_1+1$) bits and ($Y_1+1$) bits are applied to the map 61 and the corresponding $Z_4$ byte is stored in the $Z_4$ memory 110.

After the $Z_1$ and $Z_2$ bytes have been obtained, they are applied to the function generator 111, together with the four least significant bits ($x_1$) of the rack position byte and the $Z_a$ byte is obtained, wherein $$Z_a = Z_1 + (Z_2 - Z_1)\frac{x_1}{16}$$

As is seen from FIG. 3, the value of $Z_a$ is an interpolated value between the values $Z_1$ and $Z_2$ for $y_1$ and corresponding to the degree of difference between $X_1$ and $X_1+1$ represented by the $x_1$ value of the rack position byte.

Similarly, after the $Z_3$ and $Z_4$ bytes have been obtained, function generator 112 will produce an interpolated $Z_b$ byte having a value between the $Z_3$ and $Z_4$ bytes (for $Y_1+1$).

Finally, the $Z_a$ and $Z_b$ bytes will be applied to function generator 113 which produces a $Z_o$ byte, $$Z_o = Z_a + (Z_b - Z_a)\frac{y_1}{16}$$

Again as seen from FIG. 3, $Z_o$ is an interpolated value between the values $Z_a$ and $Z_b$ (for $Y_1+Y_1$) corresponding to the degree of difference between $Y_1$ and ($Y_1+1$) represented by the $y_1$ value of the actual engine speed byte.

The interpolated $Z_o$ byte is then stored in memory, or latch, 114 for use in the control system 10 until the time that the rack position and engine speed input information has been next updated and a new $Z_o$ signal has been calculated.

With the disclosed interpolation system of obtaining a timing advance angle byte corresponding to particular rack position and engine speed bytes, memory utilization is only about 400 bytes, accuracy is 0.4% and execution speed is about 800 microseconds. With an engine rotating at 2000 rpm, and with input information being updated every 30° of engine revolution, updating will occur every 2500 microseconds, thus affording ample time for calculation of the output signal.

The steady state urban timing map 63 and steady state highway timing map 64 are three dimensional maps generally similar to the cold engine timing map of FIGS. 2 and 3. Interpolated values of timing advance control signals are obtained from these maps 63,64 in the same manner as that previously detailed for the cold engine timing map 61. Maps 63 and 64 differ from the cold engine maps 62, and from each other, only in the specific desired timing angle control signal that is, the z-valve-stored within the memory cells of these maps for the various combinations of rack position and engine speed. Again, the values of the stored bytes in maps 63 and 64 are determined for an engine family to meet EPA standards for urban or highway driving respectively.

Figure 4:
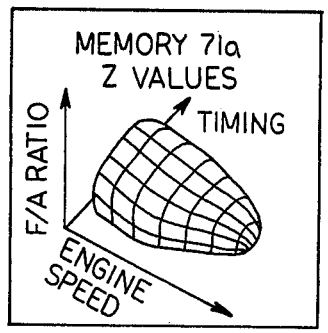
FIGS. 4 and 5 illustrate the three-dimensional schedules of the fuel/air limit and rack limit position maps of FIG. 1.
Figure 5:
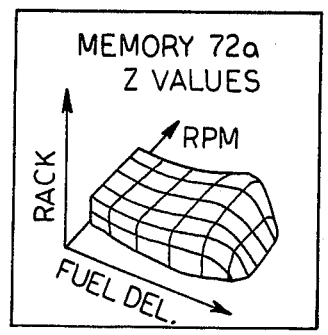

The read-only memories 71a and 72a of fuel/air limit map 71 and rack limit position map 72 are generally illustrated in FIGS. 4 and 5, respectively. As for the cold engine timing map 61, these are three dimensional memories with predetermined bytes stored therein, and interpolated byte signals are obtained therefrom in the same way as described above. As will be noted, the memory 71a of fuel/air limit map 71 has stored bytes corresponding to the optimal fuel/air ratio for different combinations of engine speed and the actual timing angle. The memory 72a of rack limit position map 72 has stored therewith byte values which will represent the limit position of rack 21 to deliver the desired amount of fuel at a particular engine speed.

Figure 6:
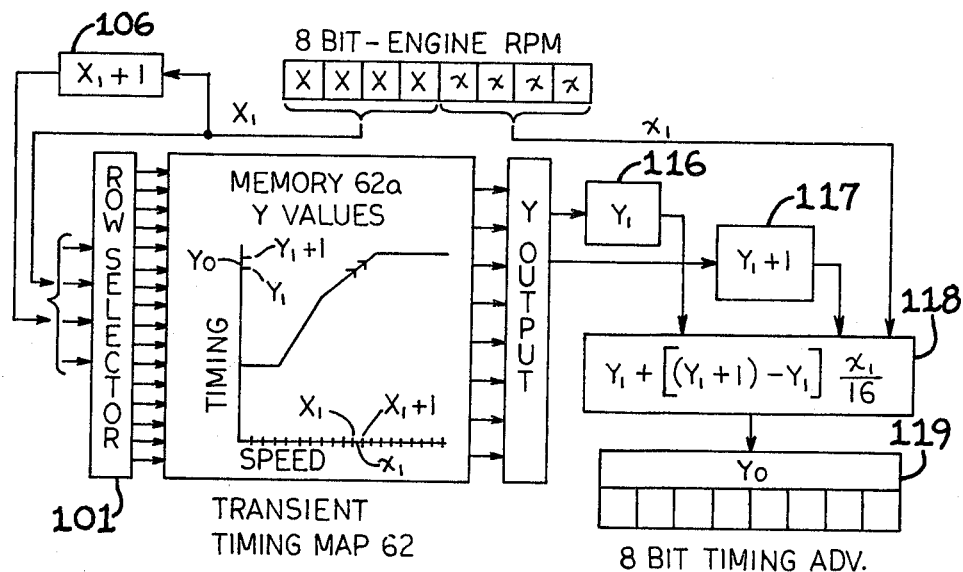
FIG. 6 is a block diagram of one of the two-dimensional maps of FIG. 1 and in particular, the transient timing map.

The transient timing map 62 of FIG. 6, includes a two-dimensional read-only memory 62a, having 16 rows and 16 possible control signal bytes for each particular row.

As illustrated in FIG. 6, the four most significant bits ($X_1$) of the engine speed byte on input line 48 are applied to the row selector 101 to select the proper row of map 62, and the corresponding $Y_1$ byte stored in the output is sent to the $Y_1$ memory 116. Stepper 106 adds a binary 1 to $X_1$, and the ($X_1+1$) binary bits are applied to the row selector to select the next, ($X_1+1$), row and the corresponding ($Y_1+1$) byte is outputted to the ($Y_1+1$) memory 117. The $Y_1$ and ($Y_1+1$) bytes are then applied to function generator 118, along with the least significant bits $x_1$ of the engine speed byte to obtain a calculated and interpolated $Y_o$ byte corresponding to the particular engine speed byte on input line 48. The $Y_o$ timing advance angle byte is then sent broadside to a $Y_o$ memory or latch 119 for use in controlling the timing means 13 until the next $Y_o$ byte is calculated.

Figure 7:
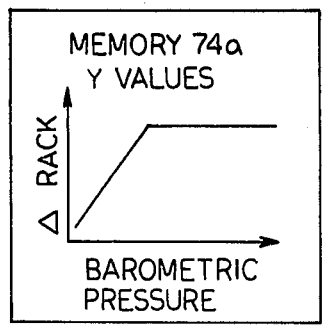
FIGS. 7 and 8 illustrate the two-dimensional schedules of the altitude derating and torque rise limit maps of FIG. 1.

The memory portion 74a of the altitude derating map 74 is illustrated in FIG. 7 and has stored therewithin rack position bytes for different values of barometric pressure. As will be noted, the values of the stored rack limit position control signals decrease, as at 121, for low values of barometric pressure. The purpose for the altitude derating map 74 in the present control system is to cut back the rack (by a lower value rack limit position control signal) at higher altitudes so as to provide an optimal air-fuel ratio. As with the other maps herein, the values stored within the map 74 are predetermined to meet EPA standards.

Figure 8:
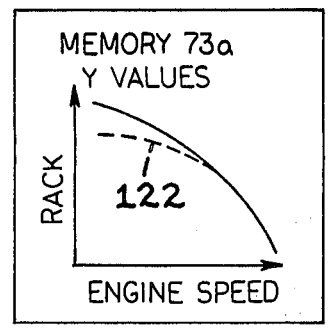

The memory portion 73a at the torque rise limit map 73 is illustrated in FIG. 8, and has stored therewithin rack limit position control data, in byte form, for different values of engine speed. As previously mentioned, when engine speed decreases due to load the rack will inherently move to provide more fuel to the engine, and the torque rise table will limit such movement so that exhaust emissions will be held to proper limits. The dotted line 122 in FIG. 8 shows the correction that will be imposed under lugging conditions by the rack cutback of altitude derating map 74 at high elevations.

Figure 9:
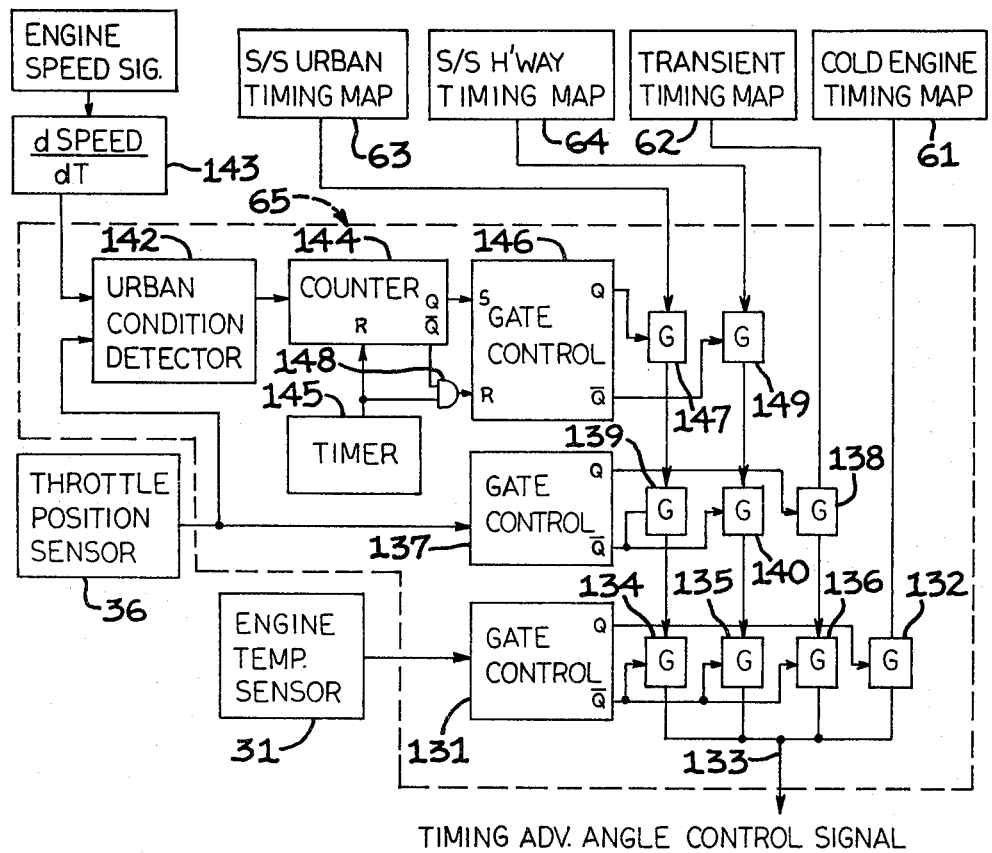
FIG. 9 is a block diagram of the timing map selector of FIG. 1.

FIG. 9 illustrates a form of selector 65 which may be used to determine which of the timing maps 61–64 is to be used to control the timing advance angle of the engine 11.

The engine temperature signal from the engine temperature sensor 31 is applied to gate control 131. On initial engine operation, the engine temperature sensor 31 will output a low temperature value causing gate control 131 to close gate 132, allowing the timing advance angle control signal from the cold engine timing map 61 to pass through to the output 133 of selector 65. Gates 134, 135 and 136 will be held open, so that the outputs of maps 62, 63 and 64 will be prevented from appearing at the selector output 133. When the engine has reached normal operating temperature, gate control 131 will open gate 132 to disconnect the cold engine timing map 61 from the selector output and will close gates 134–136 to allow the appropriate map 62, 63 or 64 to control the timing advance angle.

The throttle position signal from sensor 36 is applied to gate control 137. In general, the throttle position signal will be generated by sensor 36 only when the operator has substantially depressed the pedal for acceleration or substantially released the pedal for deceleration. When such a signal is present, gate control 137 will go Q causing gate 138 to close, connecting the transient timing map 62 to the selector output 133 (if the engine is at normal operating temperature) and will cause gates 139 and 140 to open so that the steady state maps 63 and 64 cannot control the timing advance angle. When the throttle position signal ceases (i.e. when the operator ceases calling for significant acceleration or deceleration) gate control 137 will open gate 138 to disconnect the transient timing map 62 from the selector output 133 and will close gates 139 and 140 to enable the timing advance angle to be controlled by one or the other of the steady state maps 63 or 64.

The throttle-position signal is also applied to the urban condition detector 142 together with the signal from a differentiator 143. The engine speed signal from the engine speed sensor 38 is applied to differentiator 143 which will output on engine-speed-change signal in response to changes in engine speed. The urban condition detector 142 functions to generate a signal upon a concurrence of the throttle position signal and an engine-speed-change signal from differentiator 143, i.e. when the operator is calling for acceleration and the engine speed is increasing, or when the operator is calling for deceleration and the engine speed is slowing. The signals from detector 142 are applied to counter 144 and if the count of such signals reaches a predetermined number before the counter 144 is reset by timer 145, the Q output of counter 144 will set the gate control 146 so that its Q output will close gate 147 to connect the steady state urban timing map 63 to selector output 133 (provided that gates 139 and 134 are also closed.)

After being reset, counter 144 will again count the signals from urban condition detector. As long as the number of such signals during the period of timer 145 remains above the predetermined number, gate control 146 will remain set and the steady state urban timing map 63 will remain connected to selector output 133. If, however, the count of signals from detector 143 does not exceed the predetermined number by the time of the reset signal from timer 145, the reset signal and the Q output of counter 144 will cause AND gate 148 to reset gate control 146. Gate 147 will open and the Q output of gate control 146 will cause gate 149 to close, connecting the steady state highway timing map 64 to the selector output 132.

The time period of timer 145 and the number of signals from detector 142 needed to set gate control 146 are chosen to distinguish between driving conditions which occur in urban or highway driving. Urban driving requires frequent accelerations or decelerations because of stop signs, heavy traffic and the like. Highway driving, on the other hand, will require only occasional accelerations or decelerations, as when another vehicle is being passed. During highway driving, the engine speed will decrease or increase without change in throttle positions, such as when the vehicle goes up or down grades, but such changes in engine speed will not cause the urban condition detector 142 to output a signal to counter 144 since a throttle position signal is concurrently required for such detector signal.

Figure 10:
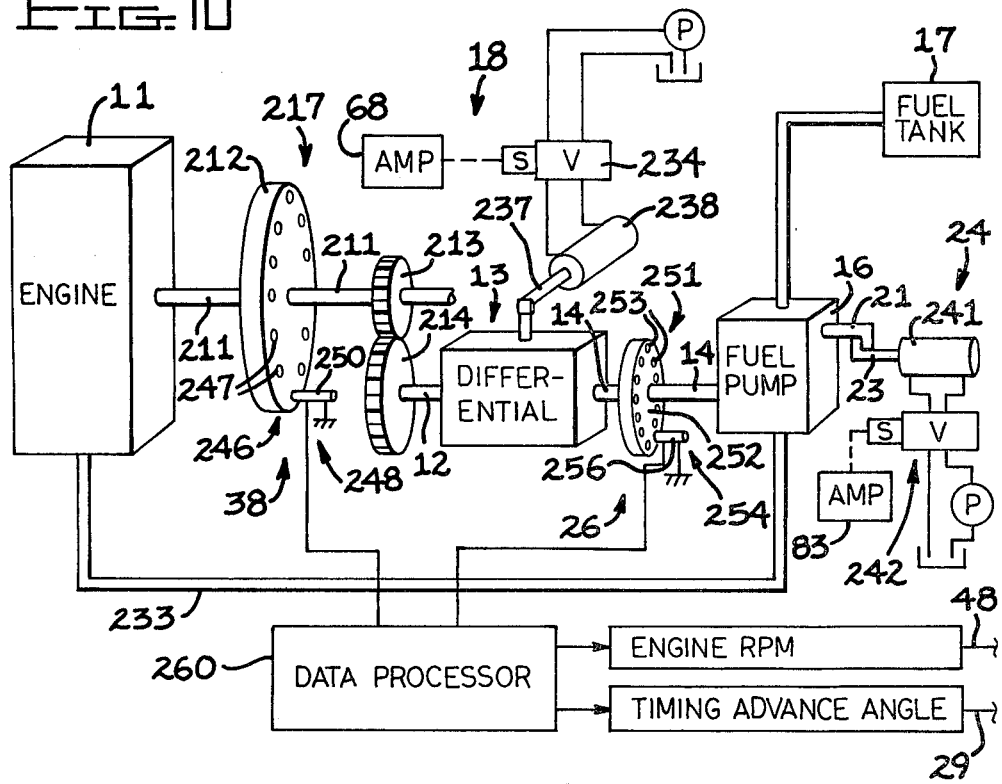
FIG. 10 is a generally schematic view of the physical components of the engine fuel system of FIG. 1 and the sensors used therewith for sensing engine speed and timing advance angle.

FIG. 10 illustrates portions of interest of a conventional engine and fuel system. In particular, a crank shaft 211 of engine 11 has a flywheel 212 fixed thereon and meshed gears 213 and 214, on crank shaft 211 and timing shaft 12, respectively, transmit engine rotation to the timing shaft 12. For a four-stroke-cycle diesel engine 11 the gear ratio of gears 213 and 214 is such that the timing shaft 12 is driven at half the speed of the engine 11.

Timing means 13 rotatively drives fuel camshaft 14 of fuel pump 16 by the timing shaft 12 and is arranged to vary, within a predetermined range, the angular relationship between the timing shaft 12 and fuel camshaft 14 so that fuel is delivered to the engine cylinders at the proper time in the cycle of engine operation. As illustrated in FIG. 10, timing means 13 may comprise a differential assembly. The system may be initially set to deliver fuel from fuel tank 17 and fuel line 233 to the engine 11 at a minimum advance (typically 14°) before top dead center of the engine pistons.

The timing advance actuator 18 means will cause the timing means 13 to set the advance angle of fuel delivery at a desired value greater than minimum during operation of the engine 11, as by actuation of solenoid valve 234 in response to the output of amplifier 68. The timing advance means will cause the fuel camshaft 14 to be driven at the same speed as that of timing shaft 12, but the angular relationship of the two shafts will be varied from the minimum advance relationship to provide the correct timing for the given conditions.

The fuel pump 16 has a movable fuel rack 21, which controls the amount of fuel flowing through the fuel pump 16. As mentioned previously, the fuel rack 21 is moved in response to foot pedal 22, and its movement is limited by fuel rack limit 23. Fuel rack limit 23 may be the piston of hydraulic cylinder 241, with piston movement being controlled by actuation of solenoid valve 242 in response to the output of amplifier 83.

A first rotation responsive means 246 is provided for generating a signal each successive time that engine 11 has rotated through 360/N degrees, N being an integer. As illustrated here, the rotation responsive means 246 includes a plurality of holes 247 in flywheel 212, equi-angularly spaced relative to, and equi-distantly spaced from the axis of the flywheel. Holes 247 thus provide surface irregularities on the ferromagnetic flywheel 212 which constitute magnetically-sensible features which rotate in a circular path around the crank shaft 211. Alternatively, the first rotation responsive means 246 may be associated with gear 214 on the timing shaft 12, gear 214 be provided with 24 holes 247.

Rotation responsive means 246 also includes a first signal generating means 248 for generating a first signal 249 (FIG. 14) in response to each movement of a flywheel hole 247 past a predetermined point in the circular path of movement of holes 247. In particular, the signal generating means 248 includes a fixed magnetic sensor 250 located adjacent the circular path of movement, the location of the sensor 250 thus determining the predetermined point in the path of movement of holes 247.

As illustrated, flywheel 212 has twelve holes 247 and thus a first signal 249 will be generated each time the engine rotates through 360/12, or 30 degrees. Since timing shaft 12 is driven at half the engine speed, a first signal will be generated each time the timing shaft rotates through 15 degrees.

A second rotation responsive means 251 is provided for generating a second signal each successive time that the engine has rotated through 360/N degrees. As illustrated here, the rotation responsive means 251 fixed to fuel camshaft 14 for rotation therewith, circular member 252 having a plurality of holes 253 equi-angularly spaced around member 223 and all at the same distance from the axis of camshaft 14. As before, holes 253 provide magnetically-sensible, surface irregularity features which move in a circular path around camshaft 14.

Rotation responsive means 251 also includes a second signal generating means 254 for generating a second signal 255 (FIG. 14) in response to each movement of a hole 253 past a predetermined point in the circular path of movement of holes 253. As illustrated, the signal generating means 254 includes a fixed magnetic sensor 256 located adjacent the circular path of movement of holes 253. Again, the fixed location of sensor 256 determines the predetermined point in the path of movement of holes 253.

As illustrated, circular member 252 has twenty-four holes 253, and thus a second signal 255 will be generated for each 15 degrees of rotation of camshaft 14. Or, since fuel camshaft 14 is driven at half engine speed, a second signal 225 will be generated for each 30 degrees of rotation of engine 10.

With the illustrated system, the number of first signals 249 from the flywheel sensor 250 will be equal to the number of second signals 225 from the fuel camshaft sensor 256 during any given length of time, such as the time that it takes the engine crank shaft 211, or the time that it takes either of the timing or fuel camshaft 12 or 14 to rotate through a full revolution, and the time interval between consecutive first signals 249 will be equal to the time interval between consecutive second signals 258. The phase relationship of the first and second signals 249 and 255 will vary in accordance with the timing advance angle set by the timing means 13.

The first and second signals from the flywheel sensor 250 and fuel camshaft sensor 256 are then sent to the data processor 260 wherein the signals are used to generate digital signals proportional to the engine speed and the timing advance angle of the fuel pump.

In the illustrated system, the engine speed and timing advance angle signals are also generated in a manner so as to cancel out the effect of engine torsionals. Piston-operated internal-combustion engines have inherent imbalances which cause regularly occurring disturbances in the operation of the engine. Since one-half of the pistons drive the crank shaft 211 during one complete engine revolution and the other one-half of the pistons drive the crank shaft 211 during the subsequent revolution, and since these two sequences have a discrete set of disturbances associated with them, the two revolutions will never have precisely the same characteristics. The crank shaft 211 will always have a somewhat different amount of power transmitted to it during one full revolution than the one immediately preceding or following.

As is detailed in FIG. 11, the inherent engine imbalances will produce a half order torsional having a full cycle during two full engine revolutions, a first order torsional occurring in one full engine revolution, a second order torsional occurring in one-half an engine revolution, and so on with higher order torsionals of decreasing magnitude. The result of the torsionals is that the instantaneous engine speed will vary as the engine rotates. The mass of the drive system and flywheel will dampen the effect of the imbalances but the actual speed will still vary sinusoidally through two engine revolutions, with the engine alternately accelerating and decelerating.

The technique used in the present invention to cancel out the effect of engine torsionals is illustrated in FIG. 12.

The instantaneous speed of the engine 11 is determined N/M times for each full revolution of the engine, N being an integer representing the number of times that a signal from the flywheel sensor 249 is generated during a full engine revolution, and M being either 1 or 2, depending upon whether a new, updated speed determination is made each time a flywheel sensor signal 249 is generated or whether a new, updated speed determination is made for every other flywheel sensor signal 249. (N/M)P consecutive instantaneous speed determinations are then added and divided by (N/M)P, P being an integer representing a number of full engine revolutions, to obtain an average engine speed during the P number of engine revolutions.

For example, if the speed determinations are to be averaged over two full engine revolutions (P=2) and a rotation responsive means 246 is used with twelve holes 247 in flywheel 212 (N=12), and a speed determination is made for each time (M=1) the flywheel sensor 250 senses the movement of a hole 247 therepast (as in FIGS. 16 and 17), then 24 successive speed determination will be averaged. As seen in FIG. 12, if the instantaneous speed determinations at the 24 sampling points in the sampling period beginning with a and ending with a' are taken, half of the instantaneous speed determination will be greater and half will be less than the average engine speed, so that when averaged the 24 speed determinations will equal the average speed of the engine for the sampling period. The same will be true for any of the other sampling periods b—b', c—c', and so forth.

As is also apparent, if the speed averaging is done at each point a',b',c' and so on, then the average engine speed will be updated each time the engine has rotated through 360/N, or 30, degrees.

If an instantaneous speed determination is made for every other hole 247 (M=2) then twelve speed determinations will be made and averaged, e.g. at a,c,e and so on, for two full engine revolutions. The successive averagings will again each be equal to the actual average engine speed, but the average engine speed information will only be available for every 60 degrees of engine rotation.

Figure 14:
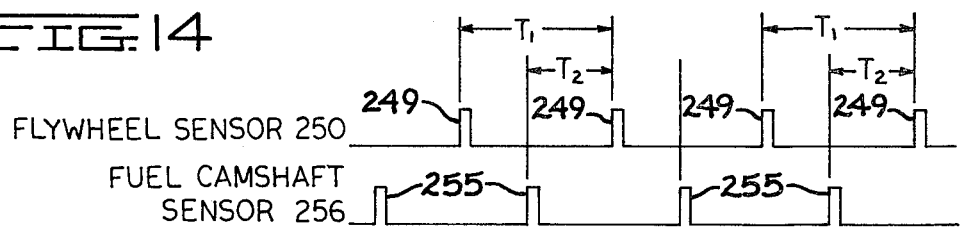
FIG. 14 is a timing chart of the signals produced by the flywheel and fuel camshaft sensors of FIG. 10 and used in the data processor of FIG. 13.

FIG. 13 illustrates one embodiment of data processor 260 which can be used to generate average speed and average timing advance angle signals in response to generation of signals by the flywheel and fuel camshaft sensors 250 and 256. As is seen in FIG. 14, flywheel sensor 250 will generate a series of first signals 249 in response to each passage of a flywheel hole 247 therepast, with a time lapse of $T_1$ between consecutive leading edges of the signals. The fuel camshaft sensor 256 will likewise generate a series of second signals 255, each also having a time lapse of $T_1$, between consecutive signals. The first and second signals 249 and 255 will be out of phase with each other in an amount dependent upon the position of the timing means 13, and there will be a time lapse of $T_2$ between the leading edge of a second singal 255 and the leading edge of the next successive first signal 249. The time lapse $T_1$ is inversely proportional to engine speed—the faster the speed of engine rotation, the shorter the time of $T_1$ and vice versa. The time lapse $T_2$, for any given phase relation between the timing and fuel camshaft 12 and 14 is also inversely proportional to engine speed. The ratio of $T_2/T_1$ is proportional to the degree of phase relation between the timing and fuel camshafts 12 and 14, and will remain constant for any given degree of phase relation regardless of engine speed.

In the data processor 260 of FIG. 13, a fixed frequency clock 265 generates a continuous series of high frequency clock pulses which are applied to the inputs of the $T_1$ gate 266 and the $T_2$ gate 267. The first signal 249 from the flywheel sensor 250 is applied to flip-flop 268 so that a low Q flip-flop output from alternate first signals 249 will cause the $T_1$ gate 266 to close and a high Q flip-flop output from the next successive first signal 249 will cause the $T_1$ gate 266 to open.

During the time that the $T_1$ gate 266 is closed, clock pulses from clock 265 will pass through the gate to the $T_1$ pulse counter 269 and be counted. When the $T_1$ gate is then opened, the $T_1$ pulse counter 269 will have a count of the number of clock pulses occurring during the time interval beginning and ending with successive first signals 249. Since clock 265 has a fixed frequency, the count of the $T_1$ pulse counter 269 will be inversely proportional to the speed of the engine.

After the $T_1$ gate has opened, the count $T_1(t)$, i.e. the instantaneous count for 30° of engine revolution, in the $T_1$ counter is applied to divider 271, along with a constant $K_R$, the divider 271 functioning to divide the constant $K_R$ by the count $T_1(t)$ and serving as a speed-indicating means for generating an instantaneous speed-indicating signal, SPD(t), which is inversely proportional to the count $T_1(t)$ of the counter 266 and is thus directly proportional to the instantaneous engine speed measured during the time the $T_1$ gate 266 was closed. The constant $K_R$ is chosen to scale the $T_1(t)$ count so that a useful eight-bit binary coded SPD(t) signal is obtained by divider 271.

The SPD(t) signal is then applied to the input cell of shift register 272, the shift register having NP/M number of cells. In the embodiment presently described, shift register 272 would have 12 cells. As the engine continues to rotate, the successively generated speed-indicating signals SPD(t) will be applied to shift register 272 so that the shift register will have, at any time, the 12 most recent successive speed-indicating signals therein.

Each time a new SPD(t) signal has been entered into shift register 272, the signals in all of the shift register cells are applied to the speed averaging means 273, shown here as an adder-divider, which adds the NP/M number of speed-indicating signals and divides the sum by NP/M to generate an average speed signal. The adder-divider 273 outputs the average speed signal into the 8-bit memory, or latch 74 which stores such signal until the next average speed signal is generated. The 8-bit or byte, signal is applied to input line 48 of microprocessor 30 and used as an input to the four timing maps 61-64, the fuel/air limit map 71, the torque rise limit map 73 and the rack limit position map 72. The engine speed signal is also applied to differentiator 143 which controls the function of the timing map selector 65.

During the time that the $T_1$ gate 266 has been closed by the high Q output of flip-flop 268 in response to a first signal 249, the Q output of flip-flop 268 is also applied to AND gate 276 to enable the next successive second signal 255 from the fuel camshaft sensor 256 to close the $T_2$ gate 267. The $T_2$ gate 267 will be opened in response to the same first signal 249 which opens the $T_1$ gate 266.

During the time the $T_2$ gate 267 is closed, the $T_2$ counter 277 will count clock pulses passing through gate 267 and will thus obtain a count of the number of clock pulses occurring in the time interval beginning with a second signal 255 and ending with the next successive first signal 249.

As may be seen, the gates 266 and 267 and pulse counters 269 and 277 constitute a counting means 278 for counting clock pulses occurring in the time interval $T_1$ beginning and ending with consecutive first signal 249 from the pulse generating means 248 and for counting clock pulses occurring in the time interval $T_2$ beginning with a second signal 255 from pulse generating means 251 and ending with the next successive first signal 249 from pulse generating means 248.

When the engine is first started, the timing means 13 will be a minimum advance, e.g. 14° BTDC, and there will be an initial angular phase relation between the timing and fuel camshafts 12 and 14 to cause fuel delivery to the engine with minimum advance. Likewise, there will be an initial phase relation between the first signals 249 from the flywheel sensor 250 and the second signal 255 from the fuel camshaft sensor 256, corresponding to minimum advance, with a second signal 256 preceding the next successive first signal 255 by a particular degree of rotation. It is an aspect of the present embodiment that the circular member 252 on the fuel camshaft 14 can be randomly fixed thereto, without regard to whether its holes 253 have any particular orientation with respect to the holes 247 of the flywheel. For example, in one engine, for a given timing advance angle, it might take 10° of engine rotation between a second signal 255 and the next successive first signal 249, whereas in another engine, and with the same timing advance, it might require 20° of engine rotation between a second signal 255 and the next successive first signal 249.

In any given system, however, with the flywheel 212 fixed to crank shaft 211 and the circular member 252 fixed to the fuel camshaft 14, and with the sensor members 250 and 256 fixed relative to the circular paths of the sensible holes 247 and 253, the angle through which the engine must turn, between a second signal 255 and the next succeeding first signal 249, will be the same for any given degree of timing advance angle.

At engine start up, the engine will initially operate at minimum advance angle. The counts of both counters 269 and 277 are both applied to divider 279, along with a constant $K_T$, the divider 279 functioning to generate an initial, or reference, timing advance angle signal $TIM(o) = T_2(o)K_T/T_1(o)$, corresponding to minimum advance angle, e.g. 14° BTDC. Dividing one count by the other gives a signal which is proportional to the degree of engine rotation between a second signal 255 and the next succeeding first signal 249 relative to the degree of engine rotation between consecutive first signals 249. Such signal is thus independent of engine speed. The constant $K_T$ scales that divided counts to provide a useful binary coded signal, with the constant $K_T$ also representing the angle that the engine turns between successive first signals. Thus, in the particular system shown, if $T_1 = T_2$, then the signal TIM would represent a timing advance of 30°.

The initial timing advance angle signal TIM(o) is then stored for use in the data processor 260 until the engine is shut down.

After the initial timing advance angle signal TIM(o) has been generated, the counts of counters 269 and 277 are applied to divider 280, which functions to generate an instantaneous timing advance signal $TIM(t) = T_{2(t)}K_T T_{1(t)}$, each time following a new count by counters 269 and 277. In the embodiment of FIG. 13, 30° of engine rotation are required to develop the counts in counters 269 and 277 and a new timing advance signal TIM(t) will be generated in the next 30° of engine rotation. Accordingly, six new timing advance signals TIM(t) will be generated for each full engine revolution.

The initial and instantaneous timing advance signals TIM(o) and TIM(t) are applied to logic circuit 281. If the magnitude of the instantaneous timing advance signal TIM(t) is not less than the magnitude of the initial timing advance signal TIM(o), function generator 282 will subtract the initial timing advance signal TIM(o) from the instantaneous timing advance signal TIM(t) which is proportional to the actual degree of timing advance produced by the timing means 13. If the instantaneous timing advance signal TIM(t) is less than the initial timing advance signal TIM(o), then function generator 283 will add the angle $K_T$ to the instantaneous timing advance signal TIM(t) and then subtract the initial timing advance signal TIM(o) therefrom to generate a positive true timing signal TIM(t) to which is proportional to the actual angle of advance from minimum advance.

The successive true timing advance signals TIM(T) are entered into and advanced through the NP/M cell shift register 284. Each time a new TIM(T) signal is entered into shift register 284, the TIM(T) signals in the shift register cells are applied to adder-divider 285 which functions as an angle-averaging means for generating an average timing angle advance signal. Such signal is output into the 8-bit memory 286, or latch, which stores the signal until the next average timing advance angle signal is generated. The byte in memory 286 is applied to input line 29 of microprocessor 30 and used as an input to the fuel/air limit map 71.

Figure 15:
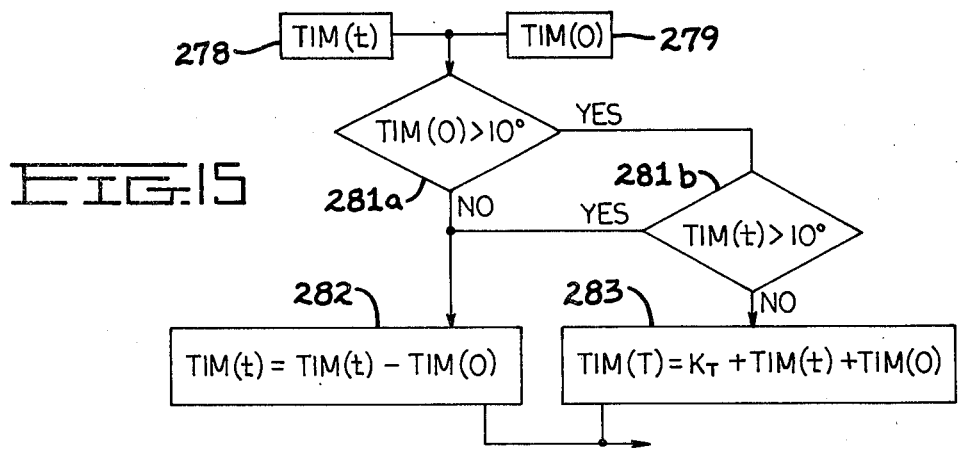
FIG. 15 is a modification of a portion of the data processor of FIG. 13.

FIG. 15 illustrates a modification of the system of FIG. 14, which may be used in an engine system wherein the timing advance means 13 is physically constrained so that a maximum timing advance of 20° from minimum advance is obtainable. In this case, the TIM(o) and TIM(t) timing advance angle signals are applied to the TIM(o) 10° and TIM(t) 10° logic circuits 281a and 281b and the function generators 282 and 283 are actuated in accordance with the logic circuits to generate the desired true timing advance signals TIM(T).

As explained above, when the data processor 260 of FIG. 13 is used with the engine-fuel pump system of FIG. 10, the circular member 252 may be randomly fixed on the fuel camshaft 14, but the average speed and average timing advance signals will be updated only six times for each full engine revolution.

Figure 16:
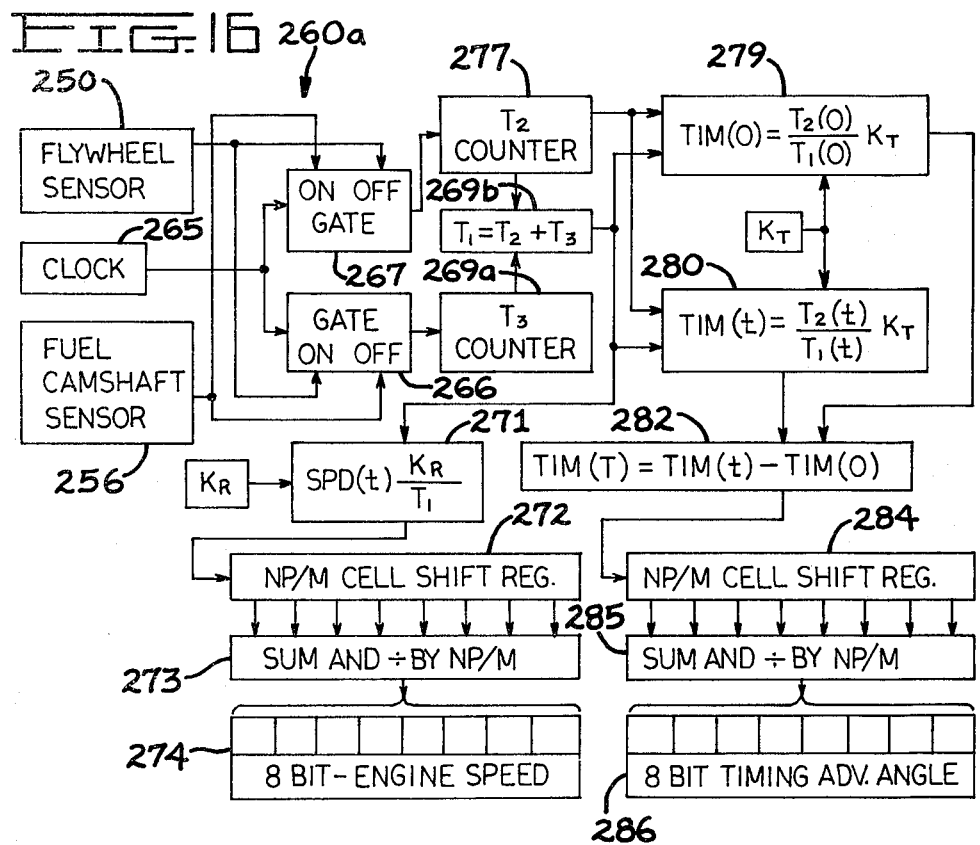
FIG. 16 is block diagram of an alternate form of the data processor of FIG. 10.

The data processor 260a of FIG. 16, when used with the engine-fuel pump system of FIG. 10, enables the average speed and average timing advance signals to be updated twelve times for each full engine revolution (i.e. M=1), utilizing the same first and second rotation responsive means 246 and 251. In this embodiment, however, the circular member 252 must be more accurately located on the fuel camshaft 14 (or the fixed location of the fixed sensors 249 and/or 255 must be more accurately chosen) so that at minimum timing advance a particular second signal 255 is generated slightly before a particular first signal 249 and at maximum timing advance such second signal is generated before the same first signal 249 but after the preceding first signal 249. For example, if the maximum timing advance is 20° from minimum, then the circular member 252 should be oriented on the fuel camshaft 14 so that, at minimum timing advance angle, a second signal 255 will be generated somewhere between one and nine degrees in advance of a first signal 249.

The data processor 260a of FIG. 16 differs from that of FIG. 13 in that each second signal 255 from the fuel camshaft sensor 256 is used to close the $T_2$ gate 267, with the gate being opened by the next first signal 249 from the flywheel sensor 250. Thus, a new count by the $T_2$ counter 277 of the clock pulses from the fixed frequency clock 265 is obtained each time the engine rotates through 30°, or, twelve times during a full engine rotation.

The data processor 260a also differs in that gate 266 is closed by each first signal 249 from the flywheel sensor 250 and is opened by the next occurring second signal 255 from the fuel camshaft sensor 256. The clock pulses during this period are then counted by the $T_3$ counter 269a, with the count being proportional to the length of this time period.

Figure 17:
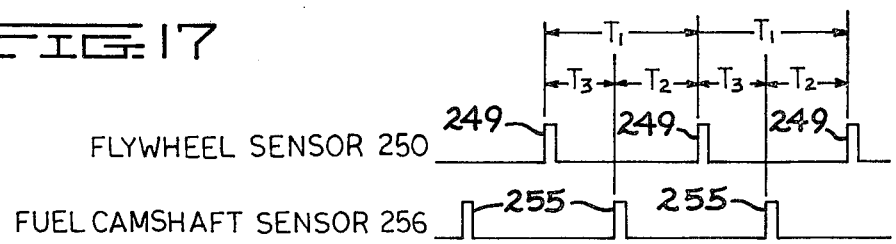
FIG. 17 is a timing chart of the signals produced by the flywheel and fuel camshaft sensors of FIG. 10 and used in the data processor of FIG. 16.

After the $T_3$ count has been obtained and during the time that the $T_2$ counter 277 is counting clock pulses, the $T_3$ count is sent to adder 269b, enabling the $T_3$ counter 269a to be reset. After the $T_2$ count has been obtained by counter 277, it too is sent to adder 269b and a $T_1 = T_2 + T_3$ signal is generated during the time the next $T_3$ count is being obtained. As is seen in FIG. 17, regardless of the time relation of the sensor signals 249 and 255, the time periods $T_2 + T_3$ will always equal the time period $T_1$.

Thus, gates 266 and 267, pulse counters 269a and 277 and adder 269b constitute counting means 278 for counting clock pulses occurring in the time interval $T_1$ beginning and ending with consecutive first signals from the pulse generating means 248 and for counting clock pulses occurring in the time interval $T_2$ beginning with a second signal 255 from pulse generating means 251 and ending with the next successive first-signal 249 from pulse generating means 248.

The $T_1$ signal from adder 269b, generated for each 30° of engine revolution, is then sent to divider 271, and an average speed indicating signal is generated by the shift register 272 (with 24 cells) and adder-divider 273 as before. In this case, 24 instantaneous speed indicating signals will be averaged for two full engine revolutions and a new average speed indicating signal will be generated for each successive 30° of engine revolution.

The $T_1$ signal from adder 269b and the $T_2$ signal from counter 277 will also be applied, as before, to dividers 279 and 280 wherein an initial timing advance signal TIM(o) and subsequent instantaneous timing advance signals TIM(t) are generated.

Since the circular member 252 on the fuel camshaft 14 is oriented so that the instantaneous timing advance signal TIM(t) is always greater in magnitude than the initial timing advance signal TIM(o), these signals are then sent directly to function generator 282 wherein is generated the instantaneous true timing advance signal TIM(T) = TIM(t) − TIM(o). The TIM(T) signals are sent successively to 24-cell shift register 284 and the 24 signals occurring during two full revolutions of the engine are averaged by adder-divider 285 and latched into the 8-bit memory, or latch 286, once for each successive 30° of engine rotation.

Industrial Applicability

As may be seen from the above, the control system 10 of the present invention provides an integrated and automatic regulation of engine timing and maximum allowable fuel rate so that maximum engine performance can be realized, in its various modes of operation, while limiting smoke and emissions to required levels.

The disclosed control system is particularly useful with four-stroke-cycle diesel engines used in highway trucks.

Although the invention has been described particularly in connection with diesel engine operation, it is to be realized that gasoline engines present the same general problem of emission control, and that the specifically disclosed invention could be readily adapted to control the ignition timing of a gasoline engine and the maximum allowable amount of fuel delivery to the cylinder of such engine in a manner as disclosed herein.

Additionally, a system such as that described could be used to automatically regulate features of an engine other than the timing and maximum permissible fuel delivery.

We claim:

1. A control system (10) for an engine-fuel supply system, said engine fuel-supply system including an internal combustion engine (11) having a rotatable crank shaft (211), an operator-controlled throttle (22), a fuel pump (16) for supplying fuel to said engine (11), a first settable engine control means (13) comprising a timing means (13) for driving said fuel pump (16) at a speed proportional to the rotational speed of said crank shaft (211) and at a desired advance angle relative to the rotation of said crank shaft (211) for setting the engine timing advance, said fuel pump (16) having a movable fuel control means (21) for regulating the amount of fuel delivered by said fuel pump (16) to said engine (11), said fuel control means (21) being movable by said throttle (22) in a first direction to increase fuel delivery and in a second direction to decrease fuel delivery, and a second settable engine control means (23) comprising a fuel control limit means (23) for limiting movement of said fuel control means (21) in said one direction thereof, said control system (10) comprising:
first condition signal means (38) for generating a first condition signal having a value proportional to the speed of said engine (11);
second condition signal means (37) for generating a second condition signal having a value proportional to the distance that said fuel control means (21) has been moved;
third condition signal means (26) for generating a fluid condition signal having a value proportional to the magnitude of engine timing advance set by said timing means (13);
timing control signal means (61,63 or 64) for storing a plurality of timing advance control signals, each timing advance control signal having a predetermined value corresponding to a desired setting of said timing means (13) for engine operation at a particular combination of engine speed and fuel control means position and for generating a timing advance control signal having the predetermined value corresponding to the particular values of the first and second condition signals generated by said first (38) and second (37) condition signal means;
fuel control means limit control signal means (71,76,77,72) for storing a plurality of fuel control means limit control signals, each fuel control means limit control signal having a predetermined value corresponding to a desired setting of the position of said fuel control means limit for engine operation at a particular combination of engine speed and engine timing and for generating a fuel control means limit position control signal having the predetermined value corresponding to the first and third condition signals generated by said first and third condition signal means (38,26);
means (18) for setting said timing means (13) in accordance with the value of the generated advance control signals; and
means (24) for setting the position of said fuel control means limit (23) in accordance with the value of the generated fuel control means limit position control signal.

2. A control system (10) for a diesel engine-fuel supply system, said engine fuel-supply system including an internal combustion engine (11) having a rotatable crank shaft (211), an operator-controlled throttle (22), a fuel pump (16) for supplying fuel to said engine (11), timing means (13) for driving said fuel pump (16) at a speed proportional to the rotational speed of said crank shaft (211) and at a desired advance angle relative to the rotation of said crank shaft (211) for setting the engine timing advance, said fuel pump (16) having a fuel control means (21) controllable by said throttle (22) for regulating the amount of fuel delivered by said fuel pump (16) to said engine (11), and a movable fuel control limit means (23) for limiting the maximum amount of fuel delivered by said fuel control means (21) in said one direction thereof, said control system (10) comprising:

means (38) for generating an engine speed signal having a value proportional to actual engine speed;

means (37) for generating a fuel control means signal having a value indicative of the setting of said fuel control means (21);

first timing advance control signal means (61,63) for generating a first set of timing advance control signals each having a predetermined value in response to a desired engine timing advance for a first mode of engine operation and for a particular combination of actual engine speed and fuel control means position, and second timing advance control signal means (62,64) for generating a second set of timing advance control signals each having a predetermined value in response to a desired engine timing advance for a second mode of engine operation and for a particular combination of actual engine speed and fuel control means position;

means (29,47) for delivering said generated engine speed and fuel control means setting signals to said timing control means (61,63 or 64); and, means (18) for controlling said timing means in response to said timing advance control signals to set the timing advance of said engine (11) to the value of a generating timing advance control signal.

3. A control system (10) for an engine-fuel supply system, said engine fuel-supply system including an internal combustion engine (11) having a rotatable crank shaft (211), an operator-controlled throttle (22) a fuel pump (16) for supplying fuel to said engine (11), timing means (13) for driving said fuel pump (16) at a speed proportional to the rotational speed of said crank shaft (211) and at a desired advance angle relative to the rotation of said crank shaft (211) for setting the engine timing advance, said fuel pump (16) having a fuel rack (21) movable by said throttle (22) for regulating the amount of fuel delivered by said fuel pump (16) to said engine (11), said fuel rack (21) being movable in a first direction to increase fuel delivery and in a second direction to decrease fuel delivery, and a movable rack limit means (23) for limiting movement of said fuel rack (21) in said one direction thereof, said control system comprising:

means (18) for generating a timing advance signal having a value proportional to actual engine timing advance;

means (38) for generating an engine speed signal having a value proportional to actual engine speed;

fuel/air signal generating means (71) for generating a plurality of fuel/air signals each having a predetermined value for a predetermined combination of timing advance angle and engine speed and for generating one of said fuel/air signals in response to application of a particular value timing advance signal and a particular engine speed signal to said fuel/air signal generating means (71);

means (29,48) for applying said timing advance and engine speed signals to said fuel/air signal generating means;

means (40) for generating a manifold pressure signal having a value proportional to the magnitude of manifold air pressure;

means (76,77) for generating a fuel delivery signal proportional to the value of said fuel/air signal divided by the value of said manifold pressure signal;

rack limit control means (72) for generating a plurality of rack limit position control signals each having a predetermined value for a predetermined combination of fuel delivery and engine speed and for generating one of said rack limit position control signals in response to application of a particular value fuel delivery signal and a particular value engine speed signal to said rack limit control means; and means (24) for moving said rack limit in response to said rack limit position control signals to the position determined by the values of the generated rack limit position control signal.

4. A control system (10) in accordance with claim 1 wherein said third condition signal means (26) includes:

at least one first sensible member (247) rotatable at a speed constantly proportional to the speed of said engine crank shaft (211) and movable through a first circular path;

a first signal generating means (248) for generating a first signal (249) in response to each first sensible member (247) movement past a predetermined point (250) in said first circular path;

at least one second sensible member (253) rotatable at a speed constantly proportional to the speed of said crank shaft (211) and movable through a second circular path;

a second signal generating means (254) for generating a second signal (255) in response to each second sensible member (253) movement past a predetermined point (251) in said second circular path;

clock means (265) for generating a series of fixed frequency clock pulses;

counting means (278) for:

(a) obtaining a first count of the number of clock pulses occurring the time interval ($T_1$) beginning and ending with consecutive signals (249) from one (248) of said first and second signal generators (248,254), (b) obtaining a second count of the number of clock pulses occurring in the time interval ($T_2$) beginning with a signal (255) from one (254) of said first and second signal generators (248,254) and ending with a successive signal (249) from the other (248) of said first and second signal generators (248,254); and, angle-indicating means (279-283) for generating said condition signal of said one (26) of said condition signal means, said condition signal being proportional to the ratio of said first and second counts of said counting means (278).

5. A control system (10) according to claim 4 wherein the number of said first and second sensible members (247,253) of said one condition signal means (26) is such that N number of each of said first and second signals (249,255) are generated by said first and second generator means (248,254) during one full revolution of one of said crank shaft (211), N being an integer, wherein said counting means (278) has the further function of obtaining N/M number of successive first and second counts during said one full revolution, M being an integer, wherein said angle-indicating means (279-283) has the further function of generating N/M number of successive angle-indicating signals during said one full revolution, and further including:

averaging means (284,285) for generating said one condition signal each time that said engine (11) has rotated through 360 M/N degrees, said one condition signal being equal to the sum of the number of successive angle-indicating signals obtained during two complete engine revolutions divided by said number of successive signals.

6. A control system (10) according to claim 5 wherein $$TIM = \frac{T_2}{T_1} K_T,$$

in which
TIM = said angle indicating signal,
$T_1$ = said first count of said counting means (278)
$T_2$ = said second count of said counting means (278)
$K_T$ = a constant, said angle-indicating means (279-283) having the further functions of:
(a) generating an initial reference angle-indicating signal TIM(o),
(b) generating a subsequent angle-indicating signal TIM(t),
(c) generating a corrected angle-indicating signal TIM(T), wherein
TIM(T) = TIM(t) − TIM(o), when TIM(t) < TIM(o), and
TIM(T) = TIM(t) + $K_T$ − TIM(o), when TIM(t) < TIM(o).

7. A control system (10) in accordance with claim 4, wherein the other said condition signal means (38) includes:
means (271) for generating said condition signal of said other condition signal means (38) with said condition signal being inversely proportional to said first count of said counting means (278).

8. A control system (10) in accordance with claim 1 wherein said timing control signal means (61,64) includes first means (61) for generating a first set of timing advance control signals each having a predetermined value corresponding to a desired engine timing advance for a first mode of engine speed and fuel control means positions, and second means (64) for generating a second set of timing advance control signals each having a predetermined value corresponding to a desired engine timing advance for a second mode of engine operation and for a particular combination of actual engine speed and fuel control means position; and
selector means (65) for selecting said first set of timing advance control signals to be used in controlling said timing means (13) when said engine is in said first mode of operation and for selecting said second set of timing advance control signals to be used in controlling said timing means (13) when said engine is in said second mode of operation.

9. A control system (10) in accordance with claim 1 wherein said fuel control means limit control signal means (71,76,77,72) includes:
fuel/air signal means (71) for storing a plurality of fuel/air signals each having a predetermined value corresponding to a desired fuel/air ratio for desired engine operation at a particular combination of engine speed and engine timing and for generating a fuel/air signal having the predetermined value corresponding to the particular values of the first and third condition signals generated by said first and third condition signal means (38,26);
means (40) for generating a manifold pressure condition signal having a value proportional to the manifold pressure;
fuel-delivery means (76-77) for generating a fuel-delivery signal having a value proportional to the value of the generated fuel/air signal divided by the value of the generated manifold pressure condition signal; and
fuel control means limit control means (77) for storing a plurality of fuel control means limit position control signals, each fuel control means limit position control signal having a predetermined value for a desired setting of said fuel control means limit for engine operation at a particular combination of fuel delivery and engine speed and for generating a fuel control means limit position signal having the predetermined value corresponding to the particular values of the first condition signal generated by said first condition signal means (38) and the fuel-delivery signal generated by said fuel-delivery means (76,77).

10. A control system (10) in accordance with claim 9 wherein said timing control signal means (61-64) includes first means (61) for generating a first set of timing advance control signals each having a predetermined value corresponding to a desired engine timing advance for a first mode of engine operation and for a particular combination of actual engine speed and fuel control means positions, and second means (64) for generating a second set of timing advance control signals each having a predetermined value corresponding to a desired engine timing advance for a second mode of engine operation and for a particular combination of actual engine speed and fuel control means position; and
selector means (65) for selecting said first set of timing advance control signals to be used in controlling said timing means (13) when said engine (11) is in said first mode of operation and for selecting said second set of timing advance control signals to be used in controlling said timing means (13) when said engine (11) is in said second mode of operation.

11. A control system (10) in accordance with claim 1 wherein said first, second and third condition signals are each in binary coded form with a plurality of most significant bits and a plurality of least significant bits, and wherein each of said timing and fuel control means limit control signals means (61,63,64 and 71,76,77,72) includes:
a read-only memory (61a) having plurality of columns and rows and a stored control signal in binary form for each combination of said columns and rows, said control signals having Z values;
stepping means (106,108) for increasing by a binary one the binary values of the most significant bits of each of said first condition signals;
means (101) for selecting a first row of said memory (61a) in accordance with the binary value of the most significant bits of one of said condition signals and for selecting a second row of said memory in accordance with the increased value of the most significant bits of said one condition signal;
means (102) for selecting a first column of said memory (61a) in accordance with the binary value of the most significant bits of another of said condition signals and for selecting a second column of said memory in accordance with the increased value of the most significant bits of said another of said condition signals;

means (104,107,109,110) for storing outside of said memory (61a) and $Z_1$ value of the control signal for said first row and first column of said memory, the $Z_2$ value of the control signal for said second row and first column of said memory, the $Z_3$ value of the control signal for said first row and second column of said memory and the $Z_4$ value of the control signal for said second row and column row of said memory;

means (111) for obtaining an interpolated binary value $Z_a$ equal to $Z_1$ plus the difference between $Z_2$ and $Z_1$ which is proportional to the binary value of the least significant bits of said one condition signal;

means (112) for obtaining an interpolated binary value $Z_b$ equal to $Z_3$ plus the difference between $Z_4$ and $Z_3$ which is proportional to the binary value of the least significant bits of said one condition signal; and means (113) for obtaining a final interpolated control signal having a binary value $Z_o$ equal to $Z_a$ plus the difference between $Z_b$ and $Z_a$ which is proportional to the binary value of the least significant bits of said another of said condition signals.

12. A control system (10) in accordance with claim 1, wherein said third condition signal means (26) includes:

a plurality of first sensible members (247) rotatable at a speed constantly proportional to the speed of said engine (11) and movable in succession through a first circular path;

a first signal generating means (248) for generating a first signal (249) in response to movement of each first sensible member (247) movement past a predetermined point (250) in said first circular path;

a plurality of second sensible members (253) rotatable at a speed constantly proportional to the speed of said fuel camshaft (14) and movable in succession through a second circular path, a second signal generating means (254) for generating a second signal (255) in response to movement of each second sensible member (253) movement past a predetermined point (256) in said second circular path;

clock means (265) for generating a series of fixed frequency clock pulses;

counting means (278) for:

(a) obtaining a first count of the number of clock pulses occurring in the time interval ($T_1$) beginning and ending with consecutive signals (249) from one (248) of said first and second signal generators (248,254), (b) obtaining a second count of the number of clock pulses occurring in the time interval ($T_2$) beginning with a signal (255) from one (254) of said first and second signal generators (248,254) and ending with a successive signal (249) from the other (248) of said first and second signal generators (248,254), angle-indicating means (279-283) for generating said third condition signal with said third condition signal being an angle-indication signal proportional to the ratio of said first and second counts of said counting means (278); and speed indicating means (271-273) for generating said first condition signal, with said first condition signal being inversely proportional to said first count of said counting means (278).

13. A control system (10) in accordance with claim 12 wherein the number of said first and second sensible members (247,253) of said third condition signal means (26) is such that N number of each of said first and second signals (249,255) are generated by said first and second generator means (248,254) during one engine revolution, N being an integer, wherein said counting means (278) has the further function of obtaining N/M number of successive first and second counts during one engine revolution, M being an integer, wherein said speed-indicating means (271-273) has the further function of generating N/M number of successive speed-indicating signals during one engine revolution, and has the further function of generating said first condition signal each time that said engine (11) has rotated through 360 M/N degrees, with said first condition signal being equal to the sum of the successive speed-indicating signals obtained during two complete revolutions of said engine divided by said number of successive speed-indicating signals obtained during said two complete revolutions of said engine (11).

14. A control system (10) in accordance with claim 2 wherein said engine-speed and fuel control means-position signals are each in binary coded form with a plurality of most significant bits and a plurality of least significant bits, and wherein said timing control signal means (61) includes:

a read-only memory (61a) having a plurality of columns and rows and a stored control signal in binary form for each combination of said columns and rows, said control signals having Z values;

stepping means (106,108) for increasing by one the binary values of the most significant bits of each of engine-speed and fuel control means-position signals;

means (101) for selecting a first row of said memory (61a) in accordance with the binary value of the most significant bits of one of said engine-speed and fuel control means-position signals and for selecting a second row of said memory in accordance with the increased value of the most significant bits of said one of said engine-speed and fuel control means-position signals, means (102) for selecting a first column of said memory in accordance with the binary value of the most significant bits of the other of said engine-speed and fuel control means-position signals and for selecting a second column of said memory in accordance with the increased value of the most significant bits of said other of said signals;

means (104,107,109,110) for storing outside of said memory (61a) the $Z_1$ value of the control signal for said first row and first column of said memory, the $Z_2$ value of the control signal for said second row and first column of said memory, the $Z_3$ value of the control signal for said first row and second column of said memory, and the $Z_4$ value of the control signal for said second row and column row of said memory;

means (111) for obtaining an interpolated binary value $Z_a$ equal to $Z_1$ plus the difference between $Z_2$ and $Z_1$ which is proportional to the binary value of the least significant bits of said one of said engine-speed and fuel control means-position signals;

means (112) for obtaining an interpolated binary value $Z_b$ equal to $Z_3$ plus the difference between $Z_4$ and $Z_3$ which is proportional to the binary value of the least significant bits of said one of said engine speed and fuel control means-position signals; and means (113) for obtaining a final interpolated control signal having a binary value $Z_o$ equal to $Z_a$ plus the difference between $Z_b$ anbd $Z_a$ which is proportional to the binary value of the least significant bits of the other of said engine-speed and fuel control means position signals.

15. A control system (10) in accordance with claim 2 including:

selector means (65) for selecting said first set of timing advance control signals of said first means (61 or 63) to be used in controlling said timing means (13) when said engine (11) is in said first mode of operation and for selecting said second set of timing advance control signals of said second means (64) to be used in controlling said timing means (13) when said engine (11) is in said second mode of operation.

16. A control system (10) in accordance with claim 15 wherein said first mode (63) of engine operation is steady state urban operation and said second mode (64) of engine operation is steady state highway operation and wherein said control system includes:

means (143) for generating an engine-speed-change signal in response to a change in engine speed;

means (36) for generating a throttle-position signal in response to a depression or release of said throttle; and wherein said selector means (65) includes means (142,144,145) for obtaining a count of the number of times in a predetermined length of time that an engine-speed-change signal and a throttle-position signal are concurrently generated, and means (146-149) for selecting said first set of timing advance control signals of said first means (63) when said count is above a predetermined number and for selecting said second set of timing advance control signals of said second means (64) when said count is below said predetermined number.

17. A control system (10) in accordance with claim 15 wherein said control system includes:

means (31) for sensing the temperature of said engine (11); and wherein said selector means (65) includes means (131-136) for selecting said first set of timing advance control signals of said first means (61) when the temperature of said engine (11) is below a predetermined value and for selecting said second set of timing advance control signals of said second means (64) when said temperature is above said predetermined value.

18. A control system (10) in accordance with claim 15 wherein said engine-speed and fuel control means-position signals are each in binary coded form with a plurality of most significant bits and a plurality of least significant bits and wherein each of said first (61 or 63) and second (64) means of said timing control signal means (61-64) includes:

a read-only memory (61a) having a plurality of columns and rows and a stored timing advance control signal in binary form for each combination of row columns and rows, said timing advance control signals having Z values;

stepping means (106,108) for increasing by a binary one the binary values of the most significant bit of each of said engine-speed and fuel control means-position signals;

means (101) for selecting a first row of said memory (61a) in accordance with the binary value of the most significant bits of said one of said engine-speed and fuel control means-position signals and for selecting a second row of said memory in accordance with the increased value of the most significant bits of said one of said signals;

means (102) for selecting a first column of said memory (61a) in accordance with the binary value of the most significant bits of the other of said engine-speed and fuel control means-position signals and for selecting a second column of said memory in accordance with the increased value of the most significant bits of said other of said signals;

means (104,107,109,110) for storing outside of said memory (61a) the $Z_1$ value of the control signal for said first row and first column of said memory, the $Z_2$ value of the control signal for said second row and first column of said memory, the $Z_3$ value of the control signal for said first row and second column of said memory, and the $Z_4$ value of the control signal for said second row and column row of said memory;

means (111) for obtaining an interpolated binary value $Z_a$ equal to $Z_1$ plus the difference between $Z_2$ and $Z_1$ which is proportional to the binary value of the least significant bits of said one of said engine-speed and fuel control means-position signals;

means (112) for obtaining an interpolated binary value $Z_b$ equal to $Z_3$ plus the difference between $Z_4$ and $Z_3$ which is proportional to the binary value of the least significant bits of said one of said engine-speed and fuel control means-position signals; and means (113) for obtaining a final interpolated timing advance control signal having a binary value $Z_o$ equal to $Z_a$ plus the difference between $Z_b$ and $Z_a$ which is proportional to the binary value of the least significant bits of the other of said engine speed and fuel control means-position signals.

19. A control system (10) in accordance with claim 2 wherein said first timing advance control signal means (61,63,) includes third means (61) for generating a third set of timing advance control signals corresponding to a desired engine timing advance for a third mode of engine operation and for a particular combination of actual engine speed and fuel control means position;

means (31) for sensing the temperature of said engine (11); and, selector means (65) for selecting said third set of timing advance control signals to be used in controlling said timing means (13) where the temperature of said engine (11) is below a predetermined value, for selecting said first set of said second set of timing advance control signals to be used in controlling said timing means (13) in accordance with whether said engine (11) is in its first or second mode of operation and the temperature of said engine (11) is above said predetermined value.

20. A control system (10) in accordance with claim 19 wherein said first mode (63) of engine operation is steady state urban operation and said second mode (64) of engine operation is steady state highway operation and wherein said control system includes:

means (143) for generating an engine-speed-change signal in response to a change in engine speed;

means (36) for generating a throttle-position signal in response to a depression or release of said throttle (22); and wherein said selector means (65) includes means (142,144,145) for obtaining a count of the number of times in a predetermined length of time that an engine-speed-change signal and a throttle-position signal are concurrently generated, and means (146–149) for selecting said first set of timing advance control signals of said first means (63) when said count is above a predetermined number and for selecting said second set of timing advance control signals of said second means (64) when said count is below said predetermined number.

21. A control system (10) in accordance with claim 2 wherein said second timing advance control signal means (62,64) includes:

means (36) for generating a throttle-position signal in response to either depression or release of said throttle (22); and, selector means (65) for selecting said first set of timing advance control signals to be used in controlling said timing means (13) when said throttle-position signal is not being generated and for selecting said second set of timing advance control signals to be used in controlling said timing means (13) when said throttle position signal is being generated.

22. A control system (10) in accordance with claim 2 wherein said first and second timing advance control signal means (61–64) have the further function of generating a third set of timing advance control signals each having a predetermined value corresponding to a desired engine timing advance for a particular engine speed during acceleration and deceleration;

means (36) for generating a throttle-position signal in response to depression or release of said throttle; and, selector means (65) for selecting said third set of timing advance control signals for controlling said timing means (13) when said throttle-position signal is present and for selecting one of said first and second sets of timing advance control signals of said first and second means (63,64) for controlling said timing means (13) when said throttle position signal is not present.

23. A control system (10) in accordance with claim 22 wherein said first mode (63) of engine operation is steady state urban operation and said second mode (64) of engine operation is steady state highway operation and wherein said control system includes:

means (143) for generating an engine-speed-change signal in response to be change in engine speed;

means (36) for generating a throttle-position signal in response to a depression or release of said throttle; and wherein said selector means (65) includes means (142,144,145) for obtaining a count of the number of times in a predetermined length of time that an engine-speed-change signal and a throttle-position signal are concurrently generated, and means (146,149) for selecting said first set of timing advance control signals when said count is above a predetermined number and for selecting said second set of timing advance control signals when said count is below said predetermined number.

24. A control system (10) in accordance with claim 3 wherein said first timing-advance, engine-speed and fuel-delivery signals each constitutes a condition signal and are each in binary coded form with a plurality of most significant bits and a plurality of least significant bits, and wherein said fuel/air signal generating means (71) and said rack limit control means (72) each includes:

a read-only memory (71a or 72a) having a plurality of columns and rows and a stored control signal in binary form for each combination of said columns and rows, said control signals having Z values;

stepping means (106,108) for increasing by a binary one the binary values of the most significant bits of each of first and second of said condition signals;

means (101) for selecting a first row of said memory (71a or 72a) in accordance with the binary value of the most significant bits of said condition signals and for selecting a second row of said memory in accordance with the increased value of the most significant bits of said first condition signal;

means (102) for selecting a first column of said memory (71a or 72a) in accordance with the binary value of the most significant bits of said second condition signal and for selecting a second column of said memory in accordance with the increased value of the most significant bits of said second condition signal;

means (104,107,109,110) for storing outside said memory (71a or 72b) the $Z_1$ value of the control signal for said first row of first column of said memory, the $Z_2$ value of the control signal for said second row and first column of said memory, the $Z_3$ value of the control signal for said first row and second column of said memory, and the $Z_4$ value of the control signal for said second row and column row of said memory;

means (111) for obtaining an interpolated binary value $Z_a$ equal to $Z_1$ plus the difference between $Z_2$ and $Z_1$ which is proportional to the binary value of the least significant bits of said first condition signal;

means (112) for obtaining an interpolated binary value $Z_b$ equal to $Z_3$ plus the difference between $Z_4$ and $Z_3$ which is proportional to the binary value of the least significant bits of said first condition signal; and means (113) for obtaining a final interpolated control signal having a binary value $Z_o$ equal to $Z_a$ plus the difference between $Z_b$ and $Z_a$ which is proportional to the binary value of the least significant bits of said second condition signal.

25. A control system (10) in accordance with claim 3 wherein said plurality of rack limit position control signals of said rack limit control means (72) constitutes a first set of rack limit position control signals, and further including:

torque rise limit control means (73) for generating a second set of rack limit position control signals each having a predetermined value corresponding to a desired maximum rack limit position for a particular engine speed during engine lugging and in response to application of a particular value engine speed signal to said torque rise limit control means (73); and selector means (78) for selecting the least value of concurrent rack limit position control signals of said first and second sets thereof for use by said means (24) for moving said rack limit (23).

26. A control system (10) in accordance with claim 25 and further including:

altitude derating means (74) for generating a third set of rack limit position control signals each having a predetermined value corresponding to a desired maximum rack limit position for a particular value of atmospheric pressure and in response to application of a particular value of atmospheric pressure signal to said altitude derating means;

means (39,48) for generating an atmospheric pressure signal proportional to existing atmospheric pressure and for applying said atmospheric pressure signal to said altitude derating means (74); and means (79) for reducing the value of a rack limit position control signal of said second set of rack limit position control signals by the value of a rack limit position control signal of said third set of rack limit position control signals.

* * * * *

UNITED STATES PATENT AND TRADEMARK OFFICE
CERTIFICATE OF CORRECTION

PATENT NO. : 4,368,705
DATED : January 18, 1983
INVENTOR(S) : Thomas T. Stevenson et al It is certified that error appears in the above-identified patent and that said Letters Patent are hereby corrected as shown below:

In the claims:

Claim 6, column 23, line 30, the sign "$<$" should be -- $\geq$ -- as set forth in the application as filed;

Claim 24, column 30, line 32, "first row of first column" should be -- first row and first column -- as set forth in the application as filed.

Signed and Sealed this

Fifth Day of April 1983

[SEAL]

Attest:

Attesting Officer

GERALD J. MOSSINGHOFF

Commissioner of Patents and Trademarks